(12) United States Patent
Rhodes

(10) Patent No.: US 8,161,963 B2
(45) Date of Patent: Apr. 24, 2012

(54) THIN FILM SOLAR COLLECTOR

(76) Inventor: Richard O. Rhodes, San Francisco, CA (US)

( * ) Notice: Subject to any disclaimer, the term of this patent is extended or adjusted under 35 U.S.C. 154(b) by 522 days.

(21) Appl. No.: 12/389,150

(22) Filed: Feb. 19, 2009

(65) Prior Publication Data

US 2009/0151714 A1 Jun. 18, 2009

Related U.S. Application Data

(63) Continuation-in-part of application No. 11/303,573, filed on Dec. 16, 2005, now abandoned.

(51) Int. Cl.
*F24J 2/04* (2006.01)
(52) U.S. Cl. .......... 126/641; 126/640; 126/669
(58) Field of Classification Search .......... 126/640–641, 126/626, 669, 904, 907, 570, 672; 165/170, 165/46
See application file for complete search history.

(56) References Cited

U.S. PATENT DOCUMENTS

| | | | |
|---|---|---|---|
| 3,450,192 A | 6/1969 | Hay | |
| 4,143,644 A * | 3/1979 | Heitland et al. | 126/626 |
| 4,205,662 A * | 6/1980 | Rhodes et al. | 126/672 |
| 4,237,965 A | 12/1980 | Hay | |
| 4,353,352 A | 10/1982 | Zinn | |
| 4,471,759 A * | 9/1984 | Anderson et al. | 126/626 |
| 4,474,173 A * | 10/1984 | Ford | 126/676 |
| 4,488,540 A | 12/1984 | McAlister | |
| 4,524,757 A | 6/1985 | Buckley | |
| 4,545,364 A | 10/1985 | Maloney | |
| 4,706,650 A | 11/1987 | Matzkanin | |
| 6,215,083 B1 | 4/2001 | Glenn | |
| 6,223,743 B1 | 5/2001 | Prueitt | |
| 6,295,818 B1 * | 10/2001 | Ansley et al. | 60/641.8 |
| 6,648,236 B2 | 11/2003 | Tacchi | |
| 2003/0070752 A1 | 4/2003 | Bergevin et al. | |
| 2004/0026225 A1 | 2/2004 | Domen | |

OTHER PUBLICATIONS

Office Action dated Mar. 14, 2008 in U.S. Appl. No. 11/303,573.

* cited by examiner

*Primary Examiner* — Alfred Basichas
(74) *Attorney, Agent, or Firm* — Beyer Law Group LLP

(57) ABSTRACT

A solar collector is provided that is formed from relatively thin polymer sheet(s). The sheet(s) are welded together to integrally define a storage tank, a plurality of fluid flow channel (e.g. risers), and other desired features within the collector. The storage tank is located at a first end of the panel and a heat exchanger is provided within the storage tank. The heat exchanger is arranged to transfer heat from the storage tank to a target fluid (such as water) that is to be heated or preheated by the collector. The collector is arranged so that when it is installed, the collector may be positioned with the storage tank located generally above the fluid flow channels. The storage tank and the fluid flow channels are arranged such that when the collector is installed and filled with a working fluid, a thermosiphon effect will cause the collection of hot water within the storage tank.

16 Claims, 17 Drawing Sheets

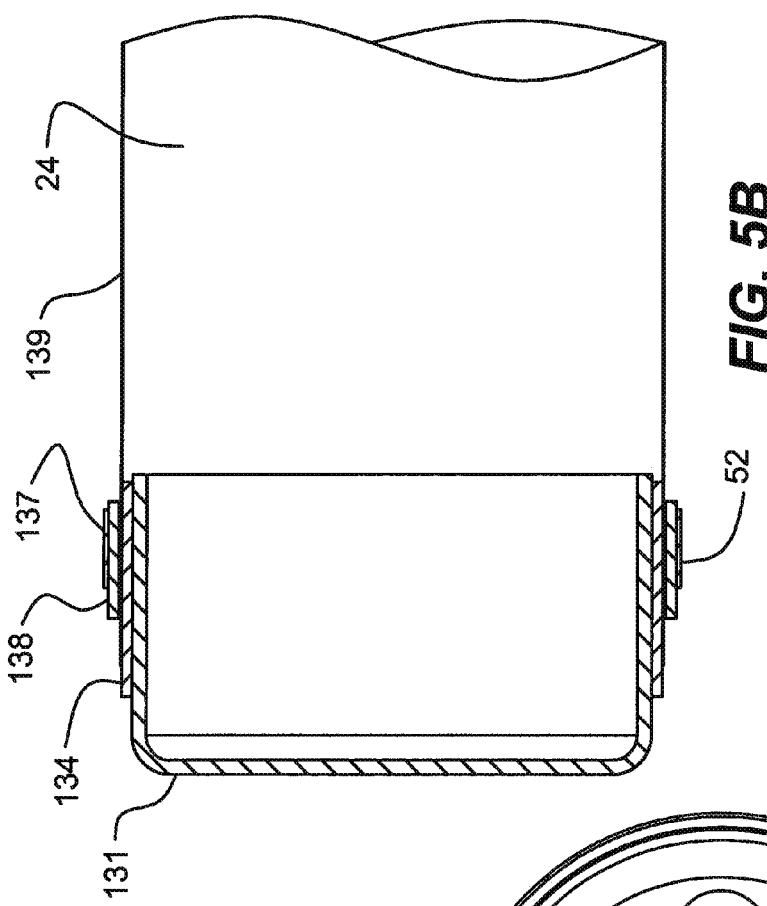
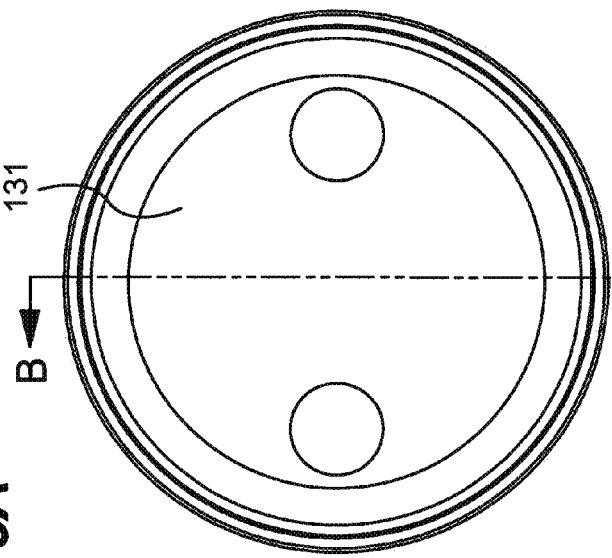
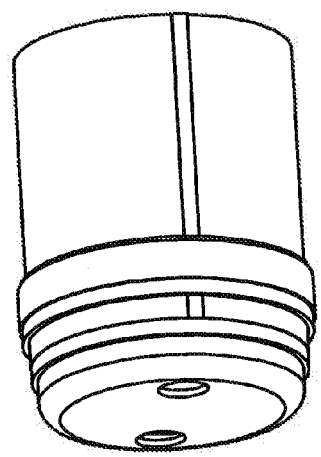
FIG. 5A
FIG. 5B
FIG. 5C

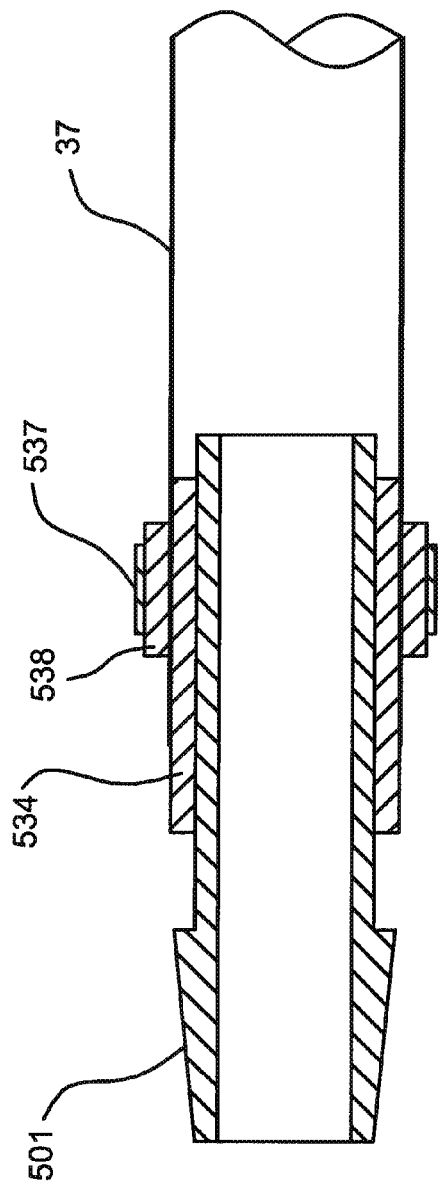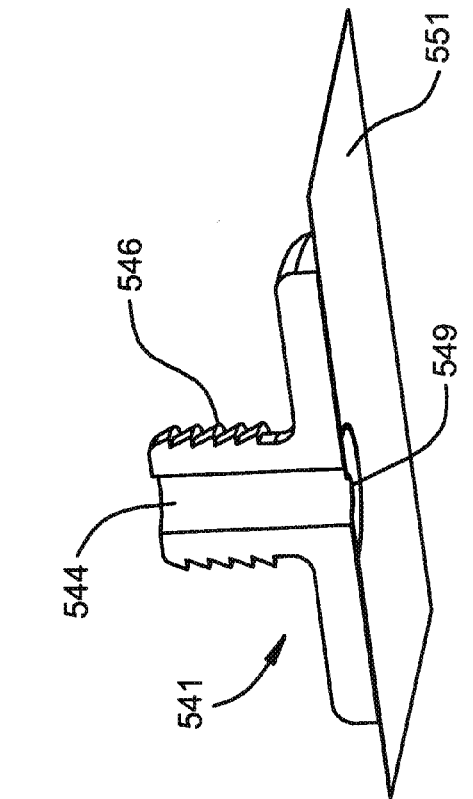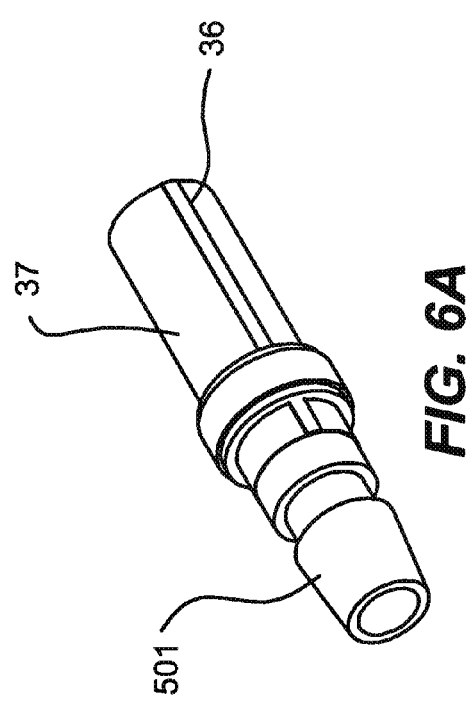

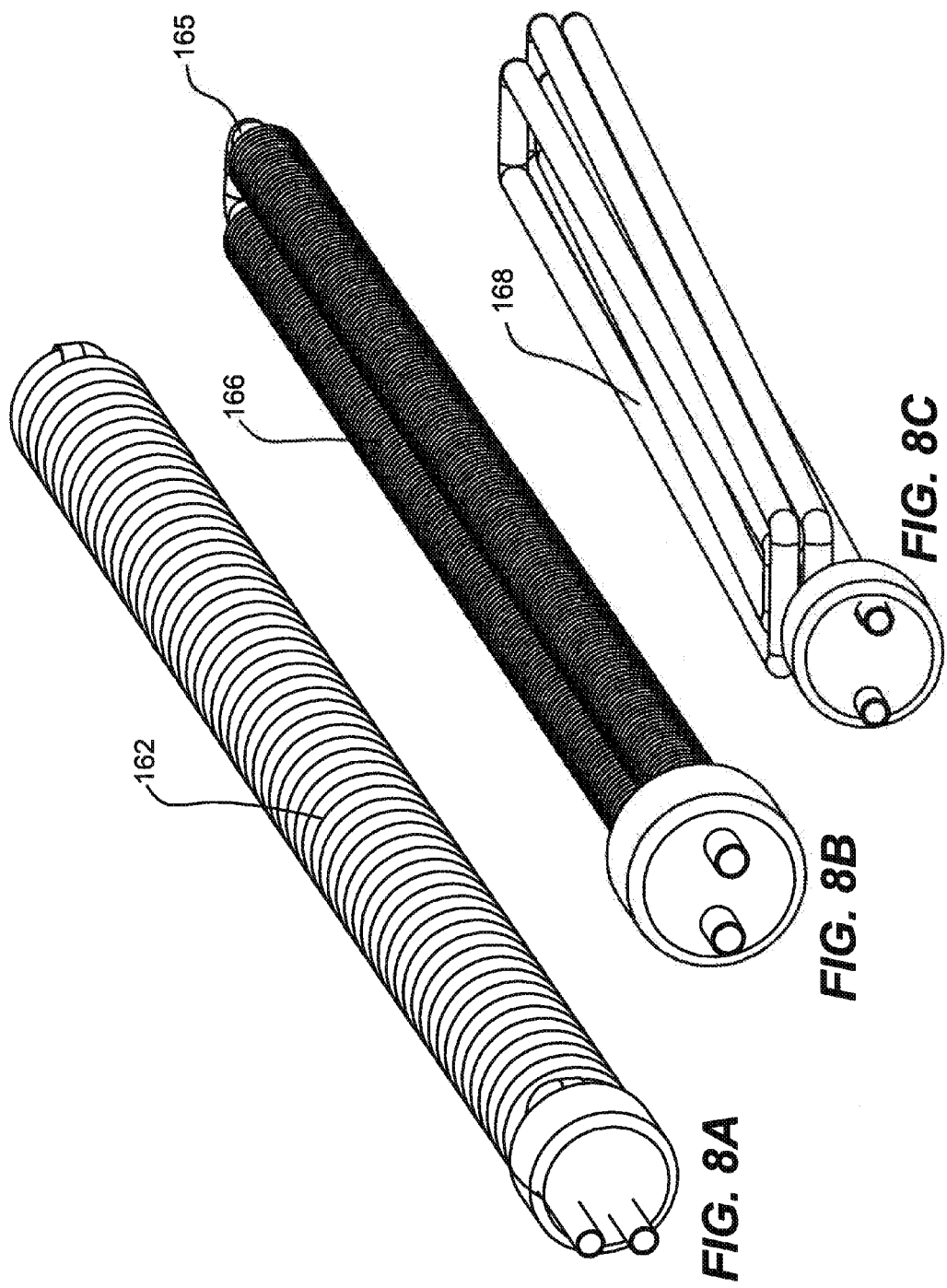

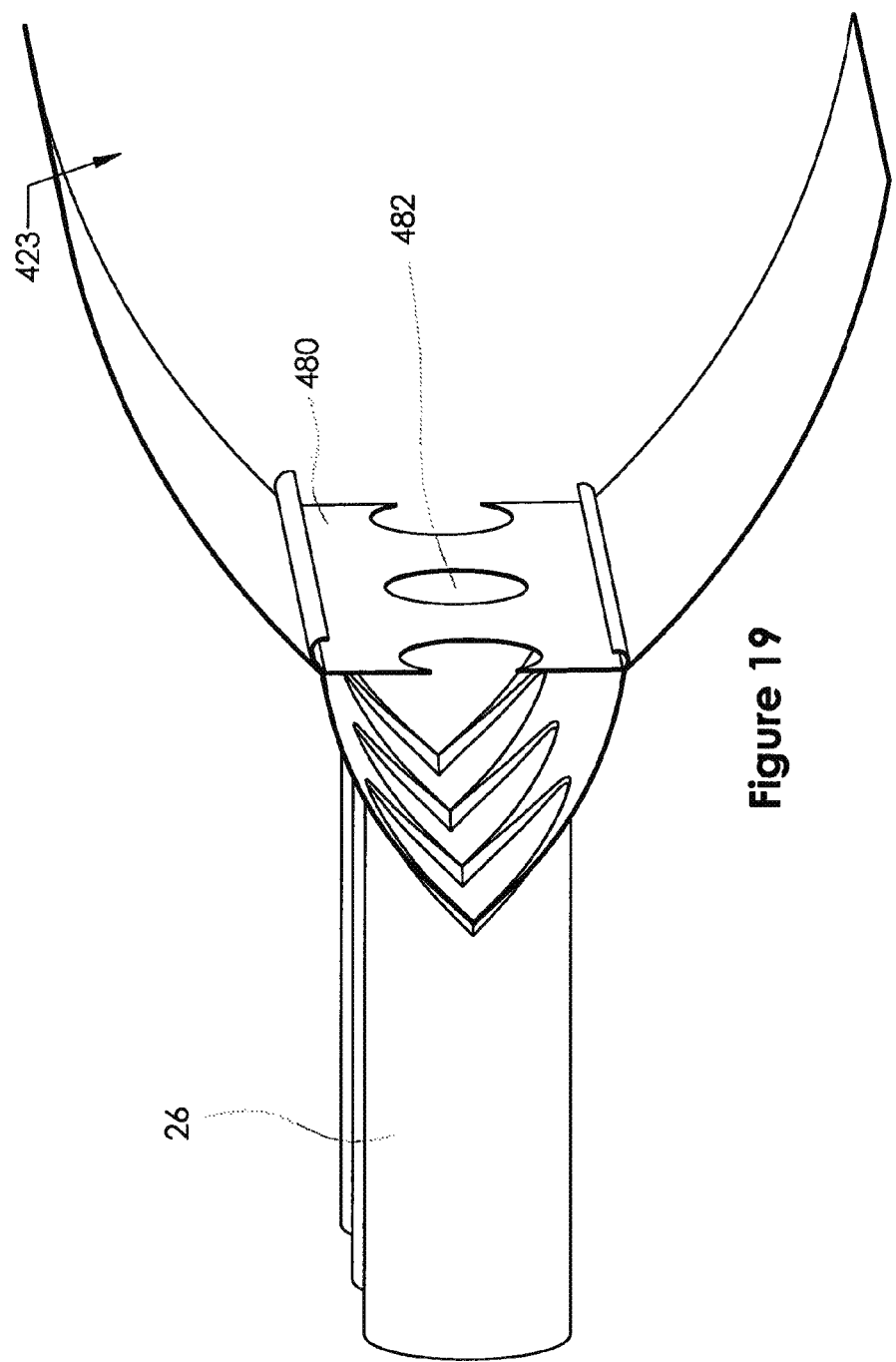

THIN FILM SOLAR COLLECTOR

CROSS REFERENCE TO RELATED APPLICATION

This application is a Continuation-in-Part of U.S. application Ser. No. 11/303,573 filed Dec. 16, 2005 which is incorporated herein by reference.

BACKGROUND OF THE INVENTION

The present invention relates generally to solar heat collection panels. More particularly, the invention relates to thin film solar collectors.

Solar heat collection panels have been used for a number of years to heat or preheat water and/or other fluids for a number of applications. Many collectors utilize a metal collection plate having a number of metal riser tubes or tubes with fins that extend between header pipes (often called manifolds). Often, the collection plates are housed within an insulated box with a transparent glazing placed over the front surface of the collector panel.

Another type of solar heat collection panel contemplates eliminating the collection plate and rather simply runs a series of side-by-side riser tubes between a pair of header pipes. The header pipes and risers can be formed from a wide variety of materials, but one class of heat exchangers use simple extruded plastic or elastomer tubing. When plastic tubing is used as the risers, adjacent tubes can be extruded, tack welded or supported together so that an array of side-by-side tubes forms a collection panel. A variety of plastics may be used to form the panels, although generally a dark, thermoplastic material is used. Such panels have been sold for a number of years by FAFCO Inc. of Chico, Calif., and are described, for example, in U.S. Pat. No. 4,205,662.

Although these and other existing solar panel designs work quite well, there are continuing efforts to develop new collector designs that meet the needs of specific applications and/or to further decrease costs.

U.S. Pat. No. 4,143,644 describes a solar panel design that is formed by welding two plastic sheets together. Although the patent describes a low cost collector design, the design does not appear to have enjoyed substantial commercial success. It is believe that one of the reasons for this is that the described design appears to be highly susceptible to: (a) stress concentrations that can lead to collector failures due to delamination of the welded sheets; and (b) kinking or other deformation of the flow paths, which can significantly reduce the efficacy of the collector. Furthermore, the '644 patent contemplates the use of just one fluid supply line and one fluid return line for communicating between its fluid reservoir and the collector flow channels which accentuates the risk of flow interruptions due to kinking or the like. These risks are even further accentuated by the fact that the only lines in communication with the reservoir are located on peripheral sides of the collector near tie down structures (i.e. holes 8) used to hold the collector in place.

SUMMARY OF THE INVENTION

A solar collector is provided that is formed from one or more relatively thin polymer sheet(s). In one aspect of the invention, the sheet(s) are welded together to integrally define a storage tank, a plurality of fluid flow channel (e.g. risers), and other desired features within the collector. The storage tank is located at a first end of the panel and a heat exchanger may be provided within the storage tank. The heat exchanger is arranged to transfer heat from the storage tank to a target fluid (such as water) that is to be heated or preheated by the collector. The collector is arranged so that when it is installed, the collector may be positioned with the storage tank located generally above the fluid flow channels. The storage tank and the fluid flow channels are arranged such that when the collector is installed and filled with a working fluid, a thermosiphon effect will cause the collection of hot water within the storage tank.

The solar collector may be welded in appropriate locations to define a number of other features. By way of example, a fill port may be provided that is suitable for filling the collector with a working fluid. A manifold may be formed at a bottom end of the fluid flow channels to permit the working fluid to flow between adjacent channels. Additionally, tie down channels that are not in fluid communication with either the storage tank or the fluid flow channels may be provided. The tie down channels are arranged to receive a tie down mechanism and, for example, may be provided on top and bottom portions of the collector. The front and back sheets may be formed from separate sheets, from a single folded sheet or from a cylindrically shaped sheet of polymer film. In other embodiments, additional thin film layers may be used to define other desired features.

In some embodiments, an insulated box is provided that covers the storage tank, but leaves the majority of the portion of the front sheet that defines the fluid channels exposed to facilitate the collection of solar energy. In other embodiments, a glazing layer and/or insulating layer may be formed from another film layer.

Additionally, a variety of mechanisms are described for reinforcing sections of the collector to reduce the risk of weld failure.

BRIEF DESCRIPTION OF THE DRAWINGS

The invention, together with further objects and advantages thereof, may best be understood by reference to the following description taken in conjunction with the accompanying drawings in which:

FIGS. 5(a)-5(c) are diagrammatic perspective, cross sectional and end views respectively of a seal formed between a heat exchanger port and a heat exchanger unit.

FIGS. 6(a) and 6(b) are diagrammatic perspective and cross sectional views respectively of a fill port in accordance with one embodiment of the invention.

FIG. 7 is a diagrammatic cross sectional perspective view of a fill port in accordance with another embodiment of the invention.

FIGS. 8(a)-8(c) are diagrammatic perspective views of different heat exchanger units.

FIG. 19 is a diagrammatic perspective view of a small segment of the riser/storage tank interface that highlights the location of a baffle suitable for reinforcing the storage tank.

It is to be understood that, in the drawings, like reference numerals designate like structural elements. Also, it is understood that the depictions in the figures are diagrammatic and not to scale.

DETAILED DESCRIPTION OF THE PREFERRED EMBODIMENTS

The present invention relates generally to solar heat collection panels formed from relatively thin film sheets.

Figure 1:
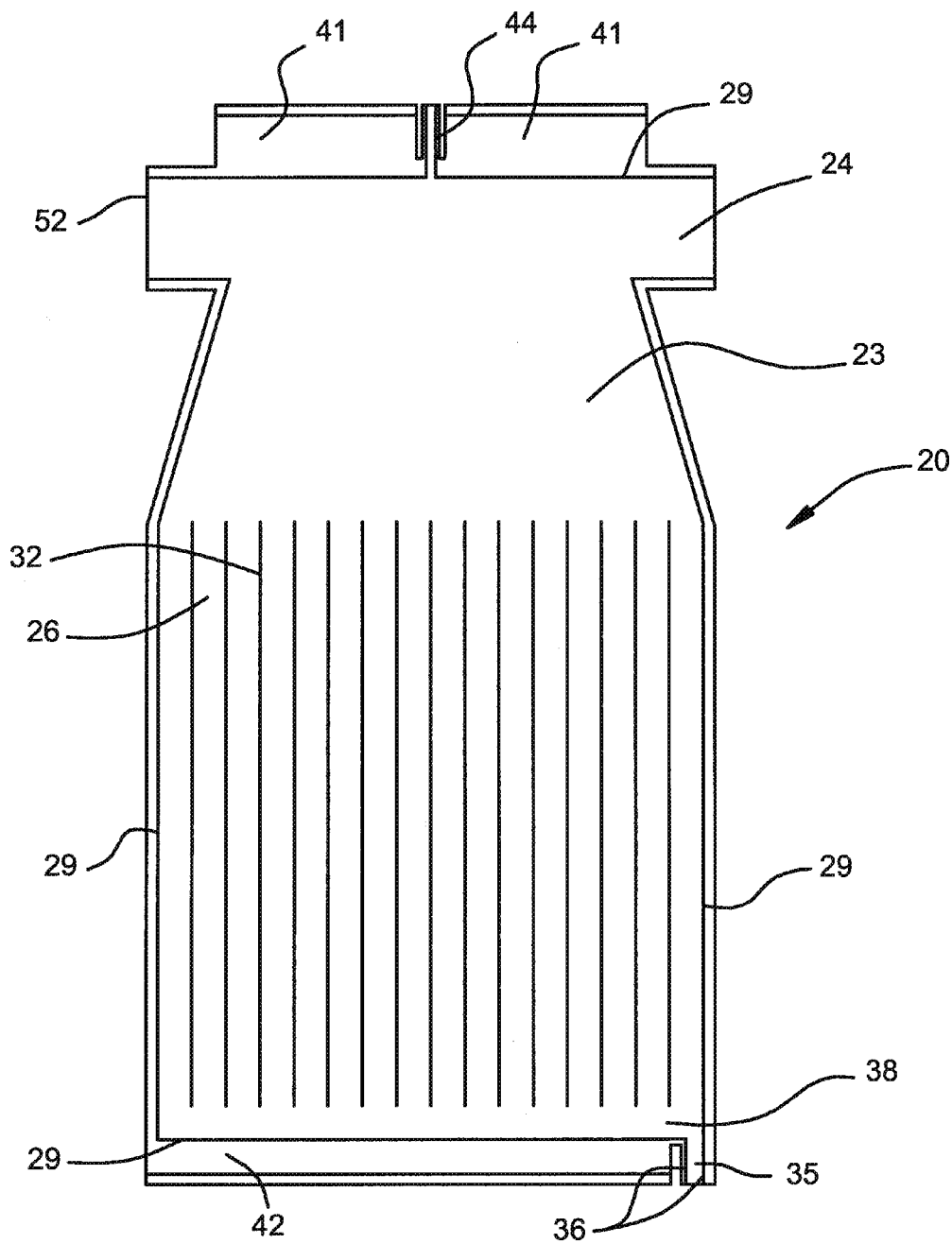
FIG. 1 is a diagrammatic top view of welded thin films suitable for forming a solar collector in accordance with one embodiment of the present invention.

Referring initially to FIG. 1, a solar collection system in accordance with one embodiment of the invention will be described. In the illustrated embodiment, a solar collector 20 is formed from a pair of sheets of a thin film polymer such as black polyethylene or polypropylene. The sheets are welded together using conventional plastic welding techniques such as impulse welding (heat sealing) or platen welding.

The welds are arranged to define a closed collector having an integrally formed storage tank 23 and a multiplicity of adjacent riser type fluid channels 26. Thus, the welds include a series of peripheral collector body welds 29 that define the height and width of the collector when it is filled. They also include a plurality of substantially parallel riser welds 32 that define the fluid channels or risers 26 that make up the bulk of the collector portion of the system. In the embodiment illustrated in FIG. 1, the tank is integrally formed with the risers so that the risers open directly into the storage tank. With this arrangement thermosiphonic flow between the storage tank and the main body of the collector panel is not limited to a single narrow channel, which both simplifies the design and reduces the probability of kink or other obstructions severely hampering the collectors efficacy.

In the context of the collector, the storage tank is positioned on the "top" side of the collector and the riser welds 32 extend "vertically" below the storage tank. The risers 26 do not extend all of the way to the peripheral collector body weld 29 at the "bottom" of the collector. With this arrangement, a manifold 38 is effectively formed at the bottom end of the collector body so that a working fluid within the collector body can readily flow between adjacent risers. In the context of this description, the terms "top", "bottom", and "vertical" are used primarily in the context of describing the drawings. It should be appreciated that when the solar collectors are installed, the storage tank would typically be positioned above the riser portions of the collector, although the collector would typically not be mounted vertically. Rather, it would be installed at an angle that is appropriate for the location at which the collectors are installed.

The solar collector 20 also has at least one fill port 35 that permits the collector to be filled with a suitable working fluid such as water or an antifreeze solution (such as a glycol type solution). The fill port 35 may be formed by simply defining fill port welds 36 that open into the collector body. In the embodiment illustrated in FIG. 1, the fill port 35 is located at the bottom of the collector body so that it opens into the manifold 38. However, in alternative embodiments, the fill port may be located at any other suitable location, as for example above the storage tank 23 or along one of the sides of the collector. Typically, only one fill port 35 would be required since the collector body is defined in a way such that all of the risers 26 open into the storage tank 23 at one end and into the manifold 38 at their other end. Accordingly, the entire collector can be filled through a single fill port. However, in alternative embodiments, multiple fill ports may be provided. The illustrated storage tank 23 has a pair of integrally formed arms 24. One or both of the arms may have a heat exchanger port 52 (described below) included therein.

The solar collector 20 also has a pair of tie down channels 41, 42 that are arranged to receive external bars, straps or the like that can be used to secure the solar collector in place when it is installed. The tie down channels 41, 42 are open on both ends and are located outside of the main collector body so that they are sealed from the collector body by at least the peripheral collector body welds 29. Upper tie down channel 41 is provided above the storage tank 23 and lower tie down channel 42 is provided below the manifold 38. With this arrangement, bars, straps or other suitable supporting structures can be inserted through the tie down channels 41, 42 and secured to a supporting fixture or other structure that the solar panel is mounted on in order to hold the solar panel in place. Like the other integral components of the solar collector, the tie down channels are defined by welding the sheets together at appropriate locations. It should be appreciated that the placement, size and configuration of the tie down channels may be widely varied to meet the needs or any particular application. In the illustrated embodiments, the tie down channels may be located in other appropriate places, as for example, along the sides of the collector.

In some embodiments, the tie down channels may extend the entire width of the collector panel. This type of arrangement may be particularly appropriate in situations where no ports are provided along the edge that the tie down channel is aligned with. In other instances, the tie down channels may extend only a portion of the width of the collector panel, or may be segmented, as seen for example with reference to tie down channels 41 and 42 in FIG. 1. In that embodiment, the upper tie down channel 41 is segmented to surround an air port 44. The lower tie down channel 42 is continuous, but does not extend the entire width of the panel so that the fill port 35 is not blocked by the tie down channel welds.

The air port 44 is provided to facilitate venting the collector when it is being filled. In some embodiments, the air port 44 may be eliminated.

In the embodiments shown, the fill port 35 and the air port 44 are formed by simply defining a fill channel and an air channel in the collector body that is open to the outside of the collector body. The collector can then be filled by inserting a hose, a funnel or other suitable fluid supply source into the fill channel. Any air that gets trapped within the collector during filling may be released through the air port 44 before, during or after the collector is filled. After the collector has been filled, the air and fill ports may be folded over and clipped to form a water-tight seal. A variety of conventional clips may be used to seal the ports.

In still other embodiments, a plastic fitting or other appropriate connector may be welded to, clamped or otherwise attached to the fill port (e.g., using a hose clamp). A removable (e.g. threaded) cap, valve or plug can then be secured to the fitting to seal the fill port.

A heat exchanger is positioned in the storage tank 23. In the embodiment shown, the collector has a pair of relatively large, heat exchanger ports or manifolds 52 that are located on opposite sides of the storage tank. However, in other embodiments, it may be desirable to provide only a single heat exchanger port. As will be described in more detail below, the heat exchange ports 52 are arranged so that a heat exchanger can be inserted into the storage tank and plumbed as desired to integrate the collector into a solar heat collection system. Alternatively, a plastic manifold may be welded into the storage tank to form the port 52.

Figure 2:
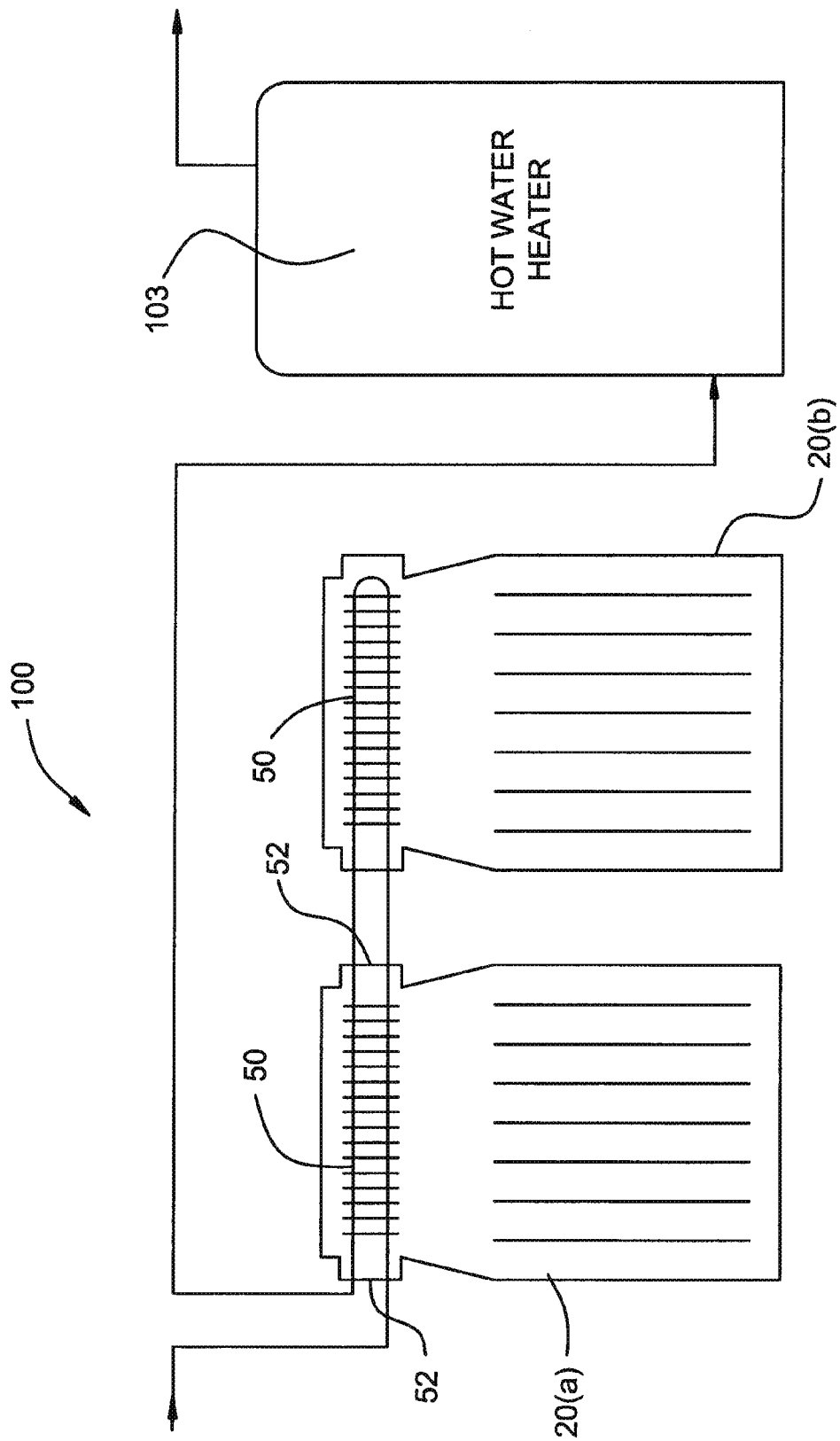
FIG. 2 is a diagrammatic illustration of a solar collection system incorporating a pair of solar collectors.

Referring next to FIG. 2, one representative solar collection system 100 incorporating the described solar collector will be described. In the illustrated system, a pair of collectors 20 are utilized as pre-heaters for a conventional hot water heater 103. The collectors 20 are mounted side by side on a suitable support structure (not shown). The support structure may be free standing, mounted on a roof, mounted on a wall or in any other suitable arrangement or the collectors may simply be placed on the ground. The collectors are plumbed so that water from a water main (or other suitable water supply) enters the heat exchanger module 50 for the first solar collector 20(a), then passes into the heat exchanger module for the second solar collector 20(b), looping back before it is routed to the hot water heater 103.

Figure 3:
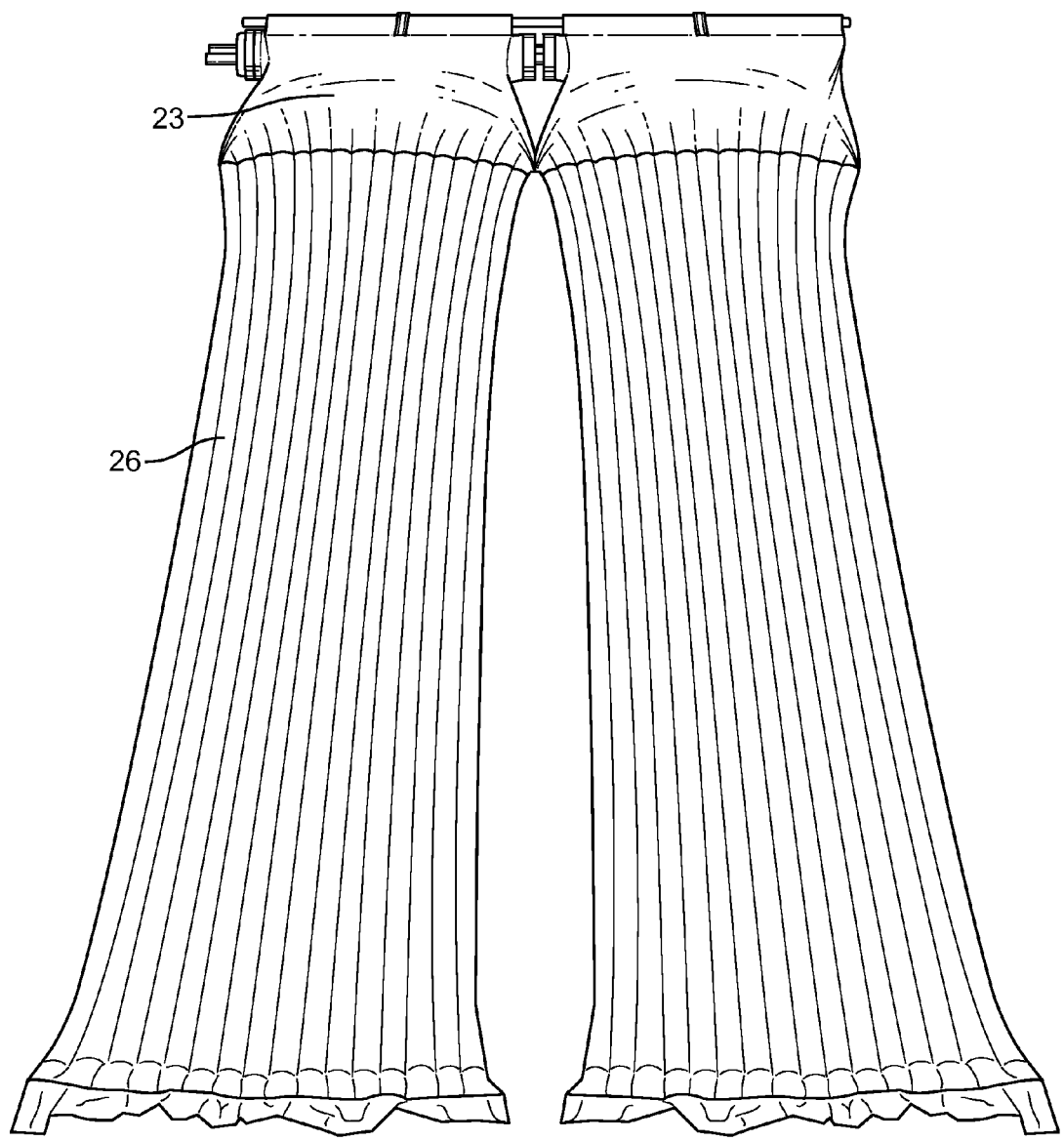
FIG. 3 is a photo showing a pair of filled solar collectors made in accordance with an embodiment of the present invention.

A somewhat different plumbing arrangement is illustrated in FIG. 3. In this embodiment, the collectors are plumbed so that water from a water main (or other suitable water supply) enters the heat exchanger module for the first solar collector 20 and then passes into the heat exchanger module for the second solar collector and thereafter passes back into the heat exchanger module for the first solar collector before it is routed to away from the collector system (e.g., to the hot water heater 103). This particular plumbing arrangement is used to facilitate description of another feature of the described solar collectors 20. The collector 20(a) has a pair of heat exchanger ports 52 located on opposite sides of the storage tank 23. With this arrangement, water may be arranged to flow into the heat exchanger from one side of the collector and out of the heat exchanger on the opposite side of the collector. However, collector 20(b) has a single heat exchanger port 52 so that both the inlet and outlet are provided on the same side of the collector. After the water passes through the second collector it passes back through the first collector before it is routed externally It should be appreciated that although a particular water preheating system is described, the described collectors may be used in a very wide variety of different systems. For example, they may be used as the sole source of hot water, in pool heating applications, as water heaters for radiant space heating applications, etc. Of course, any suitable number of solar collectors 20 may be used within the solar collection system. In some arrangements, it may be desirable to plumb multiple collectors together in series as illustrated in FIG. 2, whereas in other applications it may be desirable to plumb multiple collectors together in parallel or in other arrangements.

It should be apparent that the described collectors do not have any internal pumps or other moving parts that are arranged to circulate the fluid within the collector. Thus, the working fluid within the collector is not pressurized (although it will typically be desirable to pressurize the external water that passes through the heat exchanger). Thus, the collector works as a thermosiphon system.

Since the collectors 20 are made from thin film materials, the collector will effectively inflate when filled with a working fluid (e.g., water or an antifreeze solution). FIG. 3 is a photograph showing a pair of filled solar collector in accordance with an embodiment of the present invention. As seen therein, from outside, the collectors have an appearance that is somewhat similar to an air mattress. The dimensions of the collector, the size of the storage tank, and the widths/diameters of the risers may be widely varied. By way of example, the prototypes illustrated in FIG. 3 were formed from 2 foot by 8 foot sheets of plastic and the sheets were welded to form 16 parallel riser tubes. When the collector is filled with fluid, the width decreases by a factor of close to $2/\pi$. Each collector in this embodiment holds approximately 2 gallons of water with the storage tank holding approximately 5 gallons. Of course, the overall size of the collector, the sizes of the risers and the size of the integral storage tank may all be widely varied to meet the needs of a particular application.

Generally, any size sheets may be used. By way of example, widths on the order of 1½ to 10 feet (more preferably 2-8 feet) and heights on the order of 4-10 feet (more preferably 6-8 feet) are believed to be appropriate for most applications. The widths of the risers may also be widely varied. By way of example, unfilled riser widths of ¼ to 6 inches (more preferably ½ to 1½ inches) are believed to be appropriate for most applications. The dimensions of the storage tank can also be widely varied. By way of example, in the embodiments shown in the photographs of FIG. 3, the height of the storage tank is approximately 16 inches. Generally, storage tank heights on the order of 6 to 24 inches are believed to be appropriate for most applications. With these arrangements, the thickness of the filled storage tanks tend to be on the order of 3 to 10 inches. Although some dimensions are described that are believed appropriate for most applications, it should be appreciated that these dimensions may be widely varied to meet the needs of a particular application.

The described collectors are extremely inexpensive to produce. The collection efficiency of the described collectors is less than most conventional solar collector designs. However, they have a calculated solar fraction (SF) of about 50-65% in sun belt locations for a collector area of about 60 square feet. The design philosophy was to produce solar heat at relatively low efficiencies, but at a very low installed cost while minimizing stagnation and freezing risks.

The described arrangement is a passive collector that has a thermosiphonic flow. Common thermosiphon designs have a designated flow channel for carrying fluid to the tank, and a separate one for carrying fluid to the bottom collector manifold. Experiments demonstrated that with the described arrangement, at any given time, some of the risers 26 carry the working fluid downward, while others carry the working fluid upward. During operation, the flow within specific risers may even reverse. When large diameter tubes are used, then thermosiphonic flow may be established within individual fluid channels 26.

Figure 4:
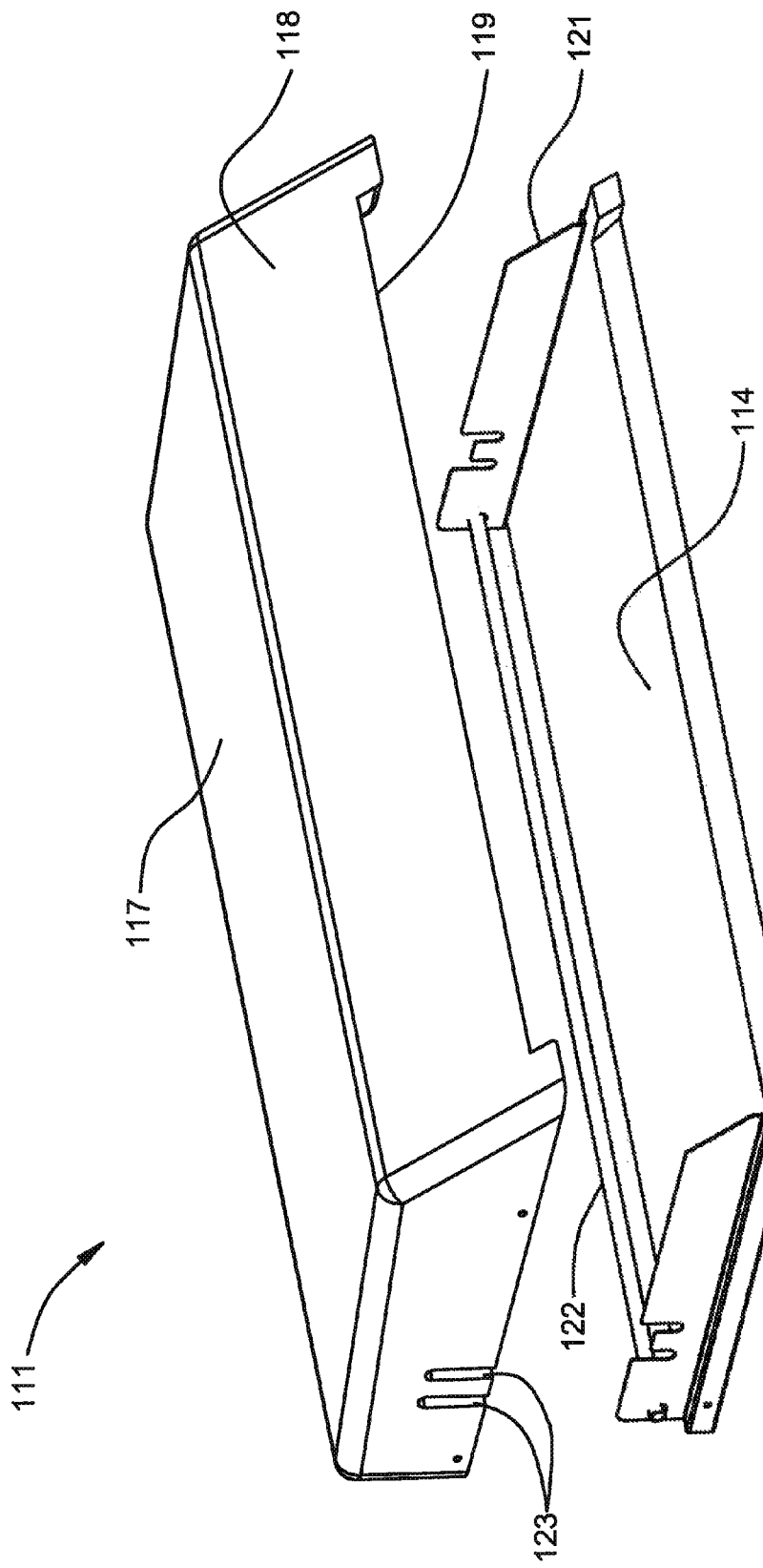
FIG. 4 is a diagrammatic perspective view of an insulated housing suitable for insulating the storage tank portion of the collector illustrated in FIG. 1.

The illustrated collectors are unglazed. It is possible to leave the storage tank uninsulated as illustrated in the photo of FIG. 3. However, in many applications it may be desirable to insulate the storage tank portion of the collector. The insulation can be accomplished using a variety of techniques. Referring next to FIG. 4, one arrangement suitable for insulating the storage tank will be described. An insulated housing 111 suitable for placement over the storage tank 23 portion of the collector 20 will be described. The housing 111 includes a backplate 114 and a top cover 117. In the illustrated embodiment, the top cover may be placed over the backplate 114 such that it covers the storage tank 23. The top cover may be secured in place using any suitable mechanism. In the illustrated embodiment, the cover is simply bolted to the backplate. However in an alternative embodiment, the cover may be hinged relative to the backplate such that the cover can open in a clamshell type manner. The front wall 118 of the top cover 117 is recessed relative to the side walls 119 so that when the cover is closed, it does not significantly pinch the riser portions of the collector. Both the backplate 114 and the top cover 117 are insulated to help reduce the loss of thermal energy from the storage tank.

A pair of brackets 121 are arranged to be fastened to a support surface to anchor the backplate and thus the collector. The brackets support and clamp a tie down bar 122 that extends through the upper tie down channel 41 of the collector. The side walls 119 also include a pair of plumbing slots 123. The plumbing slots provide an opening for the pipes that feed the heat exchanger 50 to enter the housing.

The heat exchanger 50 may take a wide variety of forms. Preferably the heat exchanger is a self-contained unit that may be inserted into the storage tank through the heat exchanger port 52. A few representative heat exchanger units are illustrated in FIGS. 8(a)-8(c). Suitable O-rings and clamps can be used to secure the heat exchanger unit 50 within the storage tank 23 and to seal the heat exchanger port 52. The heat exchanger port 52 may be formed in a wide variety of manners. Referring next to FIGS. 5(a), 5(b) and 5(c) one representative port arrangement will be described. In this embodiment, the storage tank portion 23 of collector 20 has a pair of arms 24 as illustrated in FIG. 1. At least one of the arms has a relatively large opening that serves as the heat exchanger port 52. Generally, the heat exchanger port should be sized large enough so that a suitable heat exchanger unit 50 (as for example, any of the heat exchanger units illustrated in FIG. 8) can be inserted into the storage tank portion of the collector through the port. In FIGS. 5(a)-5(c), the heat exchanger itself and the associated tubing is not shown for the purpose of clarity. The heat exchangers are shown in the drawings of FIG. 8.

The heat exchanger unit 50 has an end cap 131 that has a longitudinally extending cylindrical section and a heat exchanger gasket 134 that extends around a peripheral portion of the cylindrical section of the end cap 131. When the heat exchanger unit is placed into the arm 24 of storage tank 23, the end cap 131 is positioned such that end of the sheet overlies the heat exchanger gasket 134. A hose clamp 137 that has an integral clamp gasket 138 is then placed circumferentially around the arm 24 over the cylindrical section of the end cap. When the hose clamp 137 is tightened, a good seal is formed between the heat exchanger end cap 131 and the collector film 139.

Of course, a variety of other heat exchanger port structures can be employed as well. For example, a plastic or elastomeric ring (not shown) may be welded directly to the sheets to form the port. A heat exchanger end cap can then be either screwed into or clamped to the ring to form an appropriate seal.

As mentioned above, the heat exchanger unit may take a variety of different forms. FIGS. 8(a)-8(c) illustrate a few appropriate heat exchanger units. Each of the heat exchangers includes a heat exchanger end cap 131 that is suitable for mating with the heat exchanger port 52, although the form of the end caps may vary significantly. In each of the illustrated embodiments, the inlet and outlet are both provided on the same side of the heat exchange unit (i.e., in end cap 131). However, if desired, end caps can be provided on both sides of the heat exchanger unit with the inlet on one side and the outlet on the other, or with both an inlet and an outlet on both sides (as illustrated in the embodiment of FIG. 2) so that the collectors can be plumbed in any manner that is desired.

In the embodiment illustrated in FIG. 8(a), a coiled tube type heat exchanger is used. In this embodiment the tube 162 is wound in a helical coil to provide more surface area for heat exchange. In the embodiment illustrated in FIG. 8(b) a finned tube 165 is used as the heat exchanger. The tube is substantially U-shaped with the fins 166 being provided along the extended portions of the tube. In the embodiment illustrated in FIG. 8(c) the heat exchanger takes the form of a pipe array 168. Of course, in alternative embodiments, a variety of other heat exchanger designs can be used.

The other ports may also be configured in a variety of manners. Referring next to FIG. 6, a fill port design in accordance with one embodiment of the invention will be described. In the illustrated embodiment a fill insert 501 is secured to the fill channel 37 defined by the fill port welds 36. The fill insert 501 can be secured to the sections of the sheets that define the channel. In the illustrated embodiment, a hose clamp 537 is used to secure the fill insert to the channel. The hose clamp 537 includes an integrated clamp gasket 538 which is arranged to engage the thin film plastic channel. A fill port gasket 534 is used to seal the junction between the fill insert 501 and the fill channel 37. In other embodiments, a fill insert may be welded to the channel 37, thereby eliminating the need for the fill port gasket and/or the hose clamp 537. In still other embodiment, the fill insert can be eliminated entirely and the channel itself becomes the fill port. Of course a wide variety of other mechanisms can be used to create the fill port as well.

Referring next to FIG. 7, yet another alternative embodiment of the fill port will be described. In this embodiment, a plastic fill attachment 541 is secured to a flat section of the collector film. The fill attachment has an internal fill bore 544 and external threads 546 so that a sealing cap (not shown) can be threadably secured to the fill attachment to seal the fill port. The internal bore 544 of the fill insert is aligned with an appropriate opening 549 in the walls 552 of the collector (i.e., in one of the sheets).

In the initially described embodiment, the collector is formed by welding two sheets of plastic together in a manner that defines the storage tank 23, risers 26, ports and other components. It should be appreciated that in practice, the two sheets that are welded together may be formed from a single folded sheet. Those familiar with thin film sheet production will know that films of this type are sometimes formed in a tubular manner and an extended length of the film is provided on a roll. Of course lengths of the tubular sheet may be used as well and the use of the tubular sheet eliminates the need to provide a couple of the peripheral welds. When a tubular sheet is used as the starting material, the collector can be formed from a single segment of the tubular sheet.

A variety of different materials can be used to form the collector. Preferably the material is one that resists degradation and otherwise holds up well under direct exposure to sunlight. By way of example, 6 mil thick black polypropylene or polyethylene work well. Of course the thickness of the material can be widely varied.

One feature of the described collector arrangement is that when the collector is filled, it will contract in width as the fluid channels 26 expand. If desired, this lateral "shrinkage" can be moderated using a number of techniques. By way of example, the upper sheet can be tack welded with a greater length of material between adjacent welds than the lower sheet. With this arrangement, the flow channels will tend to pillow out more on the front side and as a result, there will be less lateral "shrinkage" when the collector is filled. This effect can be further reduced by the thickening the back sheet.

Figure 9B:
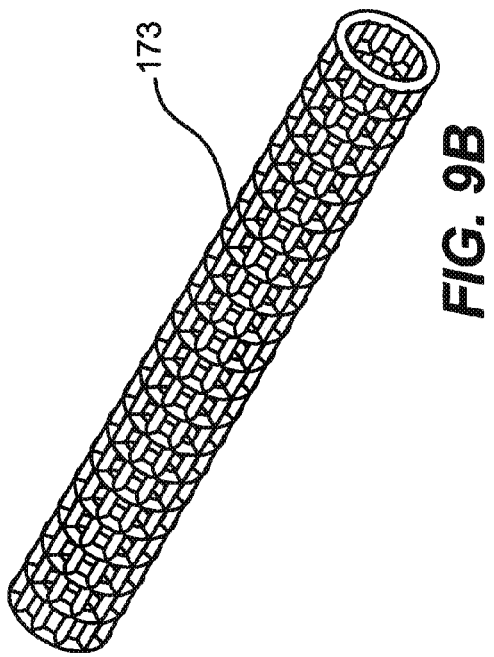
FIGS. 9(a) and 9(b) are diagrammatic perspective views of a segment of spacers suitable for holding manifolds within the collector open.
Figure 9A:
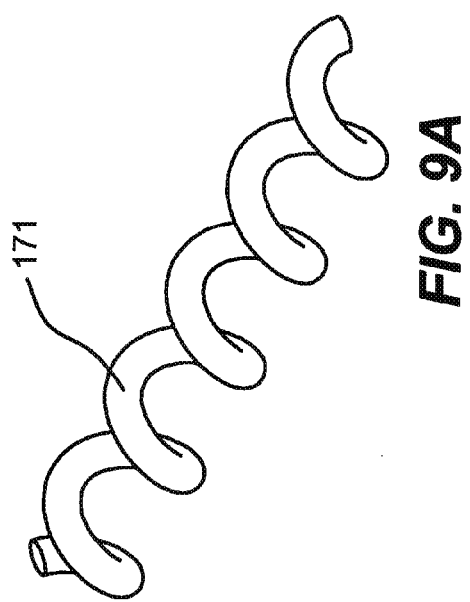

In some implementations, a potential problem that can occur during filling or use is that the manifold 38 can collapse due to lateral shrinkage. There is a concern that collapsing of the manifold can reduce the efficiency of the collector. Accordingly, in some embodiments a porous spacer is inserted into the manifold. Referring next to FIGS. 9(a) and 9(b), a couple of suitable spacer designs are illustrated. In the embodiment shown in FIG. 9(a), the spacer 171 takes the form of a helical coil. The coil can be formed from any suitable material as for example various plastic materials. The helical nature of the spacer makes it relatively compressible so that it can be compressed to a certain degree when the width of the collector is reduced as the collector is filled with a working fluid. The helical design also provides good lateral stability so that the manifold will not collapse during normal use. The open nature of the helical coil also provides ample space for fluid to flow through the manifold as appropriate during use of the collector. In other embodiments a number of other compressible porous spacer designs can be used in place of the illustrated helical coil.

Another spacer design is illustrated in FIG. 9(b). In this embodiment, a plastic mesh is formed into a cylindrical plastic mesh spacer 173 that is inserted into the manifold. The mesh provides good sized openings so that water can flow from the risers into the manifold and vice versa. Generally, the mesh type spacer is not collapsible so the length of the spacer is preferably shorter than the unfilled width of the collector so that the manifold spacer does not unduly restrict the shrinkage of the collector during filling. Of course, in other embodiments a variety of alternative spacer designs may be utilized or the spacer may be eliminated entirely.

One of the significant advantages of the described thin film collector is that the geometry of the collector, the flowpaths within the collector, the size, number and geometry of the storage tanks, risers, manifolds, ports and the other components may be widely varied to meet the needs of a particular application with minimal effort (i.e., simply by setting up the welds appropriately for a desired new design).

Figure 10:
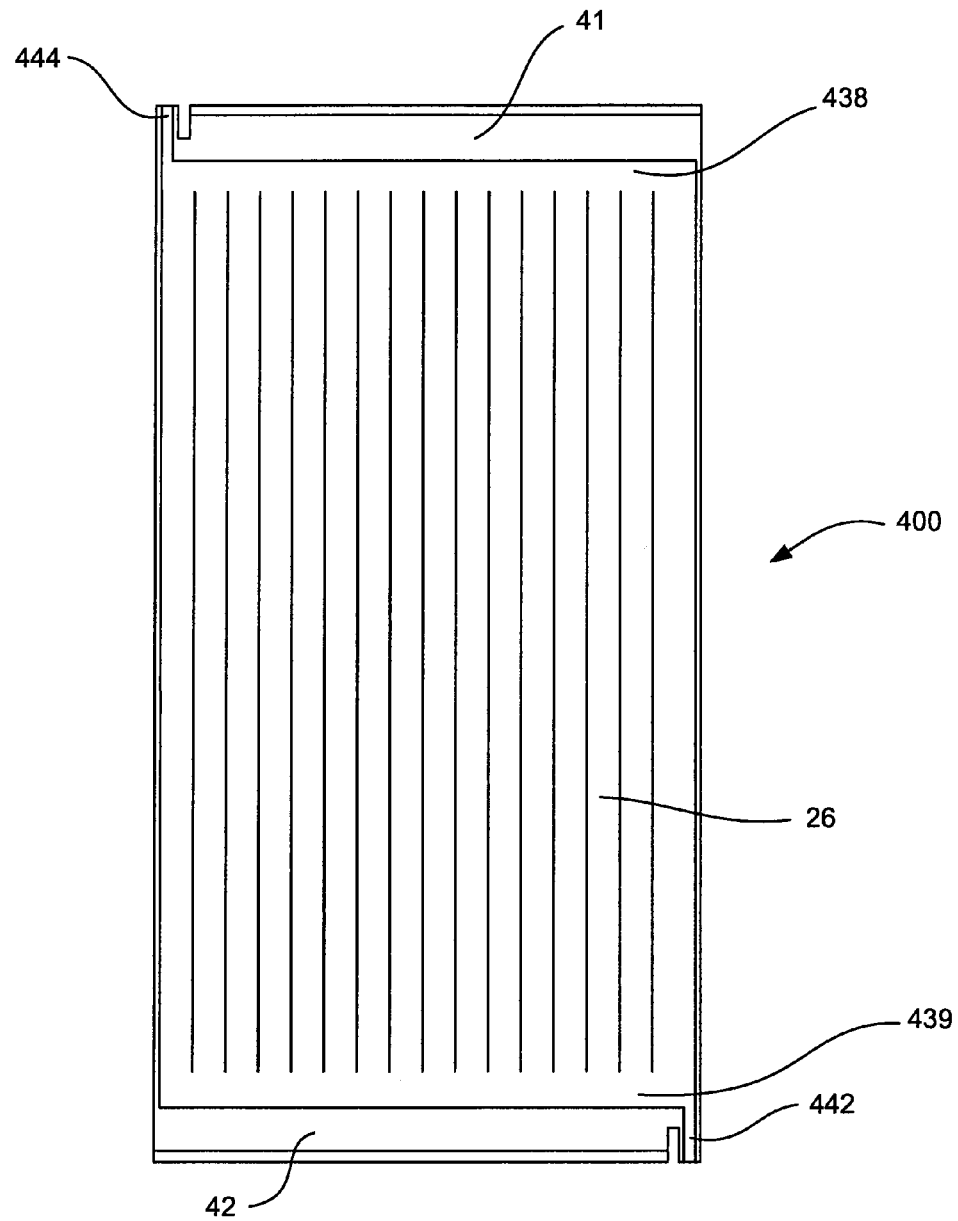
FIG. 10 is a diagrammatic plan view of welded thin films for a collector without a storage tank in accordance with another embodiment of the invention.

Referring next to FIG. 10, another collector layer will be described. In this embodiment the storage tank and the heat exchanger are eliminated so that the collector 400 directly heats the water (or other fluid) to be heated. The collector 400 has a plurality of risers 26 that extend between top and bottom manifolds 438, 439. The water enters the collector through an inlet 442 and exits through an outlet 444. The position of the inlet and outlet may be widely varied, although generally it is preferable to have the inlet at or near the bottom and the outlet at the top of the collector.

Figure 11:
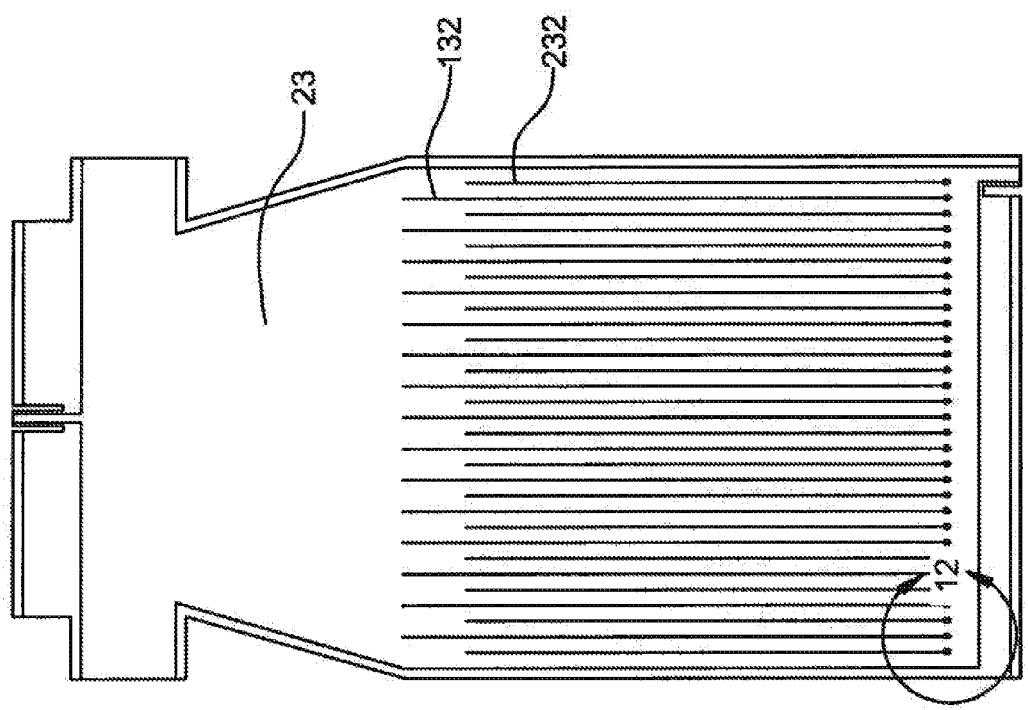
FIG. 11 is a diagrammatic plan view of a collector in accordance with yet another embodiment of the invention, which has a different riser arrangement than the collector illustrated in FIG. 1.

Referring next to FIG. 11 a collector that exhibits a slightly different riser design will be described. In this embodiment, the risers all open into the storage tank 23 much like the first described embodiment. However, in this embodiment, every other riser weld 132 is extended on the storage tank side relative to the intermediate riser welds 232. It has been observed that in some implementations, if the risers are relatively narrow where they open into the storage tank, then a "pinch" can form at the junction of the storage tank and the top opening of the riser. Such a constriction can adversely affect the flow of the working fluid within the collector. The advantage of the illustrated staggered riser weld approach is that the openings into the storage tank are larger and therefore, pinching has less of a constricting affect. At the same time, the riser still open directly into the storage tank. Although the illustrated embodiment staggers the top termination of every other riser weld, it should be apparent that the same effect can be accomplished using a variety of other staggering patterns.

Figure 12:
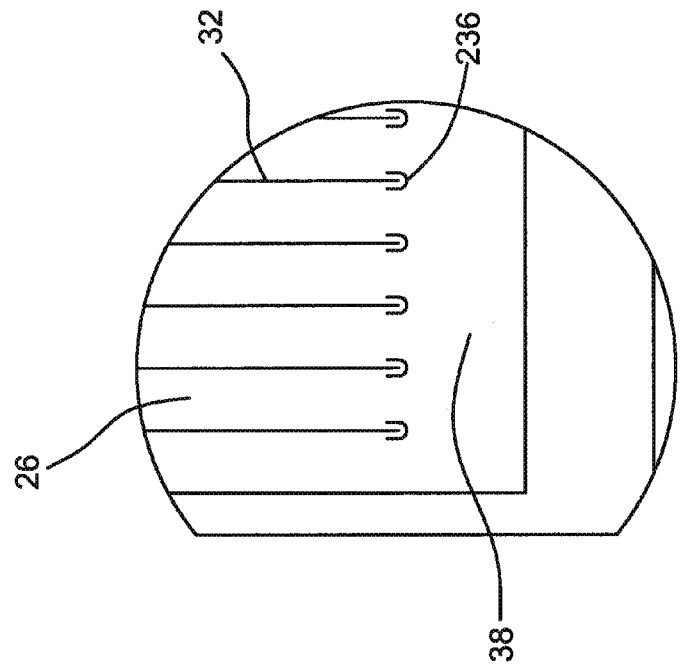
FIG. 12 diagrammatically illustrates a weld reinforcement technique that may be used to strengthen weld terminations.

Another potential problem that may experience with the use of the described collectors is that there is some risk that some of the welds will fail. Such concerns can be addressed using a variety of techniques including double welding or more broadly welding selected seams (e.g. some of the peripheral seams). One spot where stresses tend to congregate is at the ends of the riser welds 32. A variety of techniques can be used to reduce the risk of failure at such stress concentrations points. By way of example, referring next to FIG. 12, one mechanism for reinforcing the riser weld termination will be described. In the illustrated embodiment, a substantially semicircular support weld 236 is formed essentially as a cap that overlies the end of the riser weld 32. The support weld 236 provides additional support and stability in the region of the weld termination which helps prevent delamination of the sheets in that region. Of course a variety of other weld termination patterns and/or structures may be used to reinforce the ends of the riser welds as well. It is noted that in FIG. 12, the reinforcing support welds 236 are only shown on the bottom ends of the rises welds 32. However, it should be appreciated that reinforcement can be used on either or both ends of the risers and/or on other welds as well.

Figure 13B:
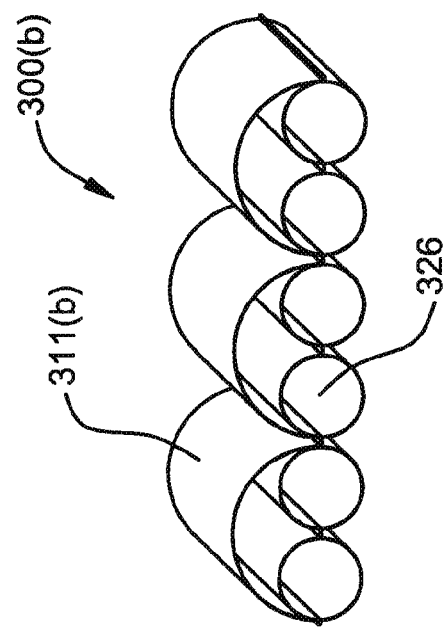
FIGS. 13(a) and 13(b) diagrammatically illustrate a thin film collector design that includes a third thin film sheet that forms a glazing or insulating layer over or under the collector.
Figure 13A:
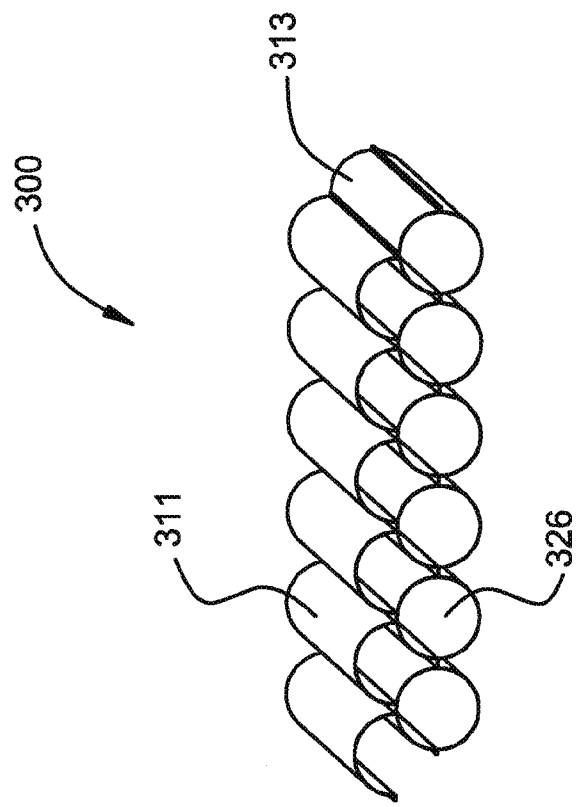

Referring next to FIG. 13, another embodiment of the invention will be described. It is well understood in the thermal solar collection arts that glazing can be used to improve the thermal efficiency of a collector. The embodiment illustrated in FIG. 13(a) provides a thin film glazing layer 311 to a solar collector. FIG. 13 is a perspective view of a small segment of the collector 300 that includes a plurality of risers 326. The risers 326 may be fabricated as described in any of the embodiments discussed above. A transparent (or translucent) thin film glazing layer 311 is welded to the upper black collector sheet so that an enclosed space is formed between the upper sheet of the collector 313 and the glazing 311. An appropriate air fill port is provided between the glazing layer and the sheet of the collector that forms the risers. Intermediate portions of the glazing 311 can be attached to appropriate intermediate portions of the upper collector sheet (e.g., the middle of the risers 326 in the illustrated embodiment). With this arrangement, air can be pumped into the region between the glazing layer 311 and the upper collector sheet. The air and glazing 311 act as an insulator that insulates the exposed surface of the collector. With this arrangement, a very low cost glazing can be integrally formed with the collector. In the embodiment of FIG. 13(a), intermediate portions of the glazing are attached in a series of longitudinally extending glazing weld lines that define air pocket channels that run substantially parallel to the risers 326. The glazing may be attached to every riser as illustrated in FIG. 13(a) or a smaller set of the risers to thereby form larger air pocket channels (e.g., that extend over 2, 3, 4 or more adjacent risers as is appropriate for a particular design). In other embodiments, other intermediate glazing weld geometries can be used.

With the described arrangement, the stagnation temperature of the collector can be controlled somewhat by adjusting the amount of air (which acts as an insulator) within the air pockets. If the glazing is completely deflated, then the stagnation temperature of the collector under any given operating condition will be reduced compared to a state in which the air pocket are fully inflated. This feature makes it possible to control the stagnation temperature of the collector somewhat by controlling the level to which the glazing is inflated.

FIG. 13(b) shows a small segment of a collector 300(b) having another glazing arrangement. In this embodiment, the glazing 311(b) is attached to the upper collector sheet at the riser welds between every other adjacent pair of risers 326(b). Of course, the glazing may be attached to the collector in a wide variety of manners to accomplish the same function.

In FIGS. 13(a) and 13(b) a transparent (or translucent) glazing layer is attached to the upper collector sheet and the region between the glazing layer and the upper collector is filled with air. It should be appreciated that the glazing effectively insulates the top surface of the collector. In alternative embodiments, a similar air gap type insulation layer can be provided over other surfaces of the collector. By way of example, a thin film insulating layer similar to the glazing layer can be attached to the bottom surface of the lower collector sheet in a manner similar to the arrangements shown in FIGS. 13(a) and 13(b). When the region between the insulating layer and the lower collector sheet is filled with air, it serves as an insulator for the bottom surface of the collector. Of course, if the insulating layer is not itself exposed to sunlight, there is no need for it to be transparent or translucent. Similarly, air gap type insulating layers can be provided over any or all surfaces of the storage tank.

The described thin film collectors are very versatile and can be used in a wide variety of applications. In the primary described embodiments, the collector is a passive device that does not have any pumps or the like. The water (or other working fluid) within the collector circulates due to thermo-siphonic flow. The heat exchanger receives pressurized water (as for example city water), which is heated within the storage tank and fed to the desired location (e.g., to a hot water heater, to an appropriate tap, etc.). Thin film collectors can also be used in active systems, with or without a heat exchanger, in which some mechanism would be needed to circulate the water to be heated. For example a pump could circulate fluid through the internal heat exchanger in the film collector to heat fluid in an external storage tank. Alternatively, if the collector is used without an internal heat exchanger, water may be pumped through the collector and then fed directly into the system in which it will be used. In one example, if the water entering the collector is pressurized (e.g. city water) a float value could be used to control the delivery of water into the collector.

In the primary described embodiments water or an antifreeze solution is used as the working fluid. However, it should be appreciated that a wide variety of other working fluids could be used. By way of example, air could be used as the working fluid if the collectors are used in a space heating application. Such a collector would typically be configured without a storage tank or heat exchanger.

Figure 14:
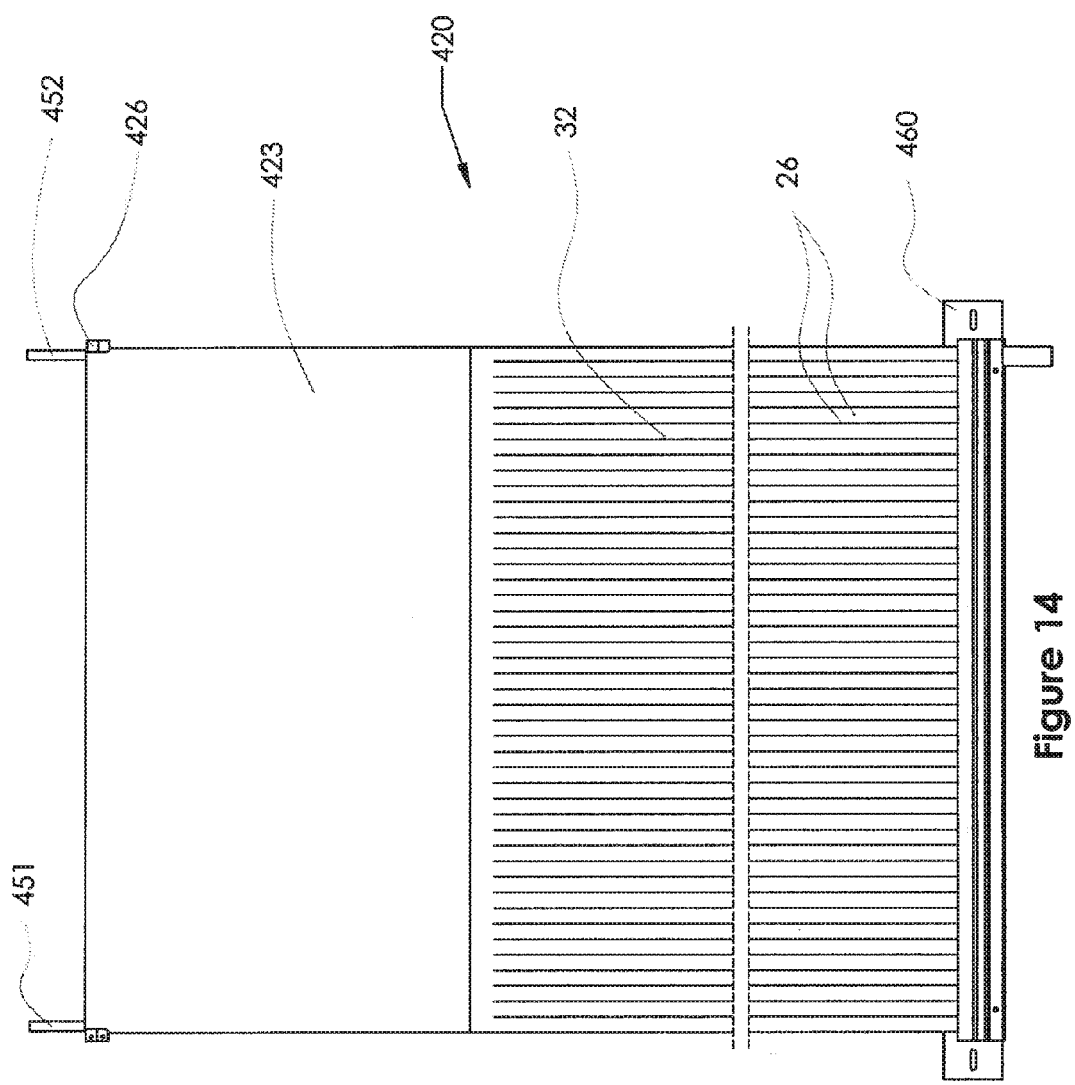
FIG. 14 is a diagrammatic top view of a collector in accordance with another embodiment of the present invention.
Figure 15:
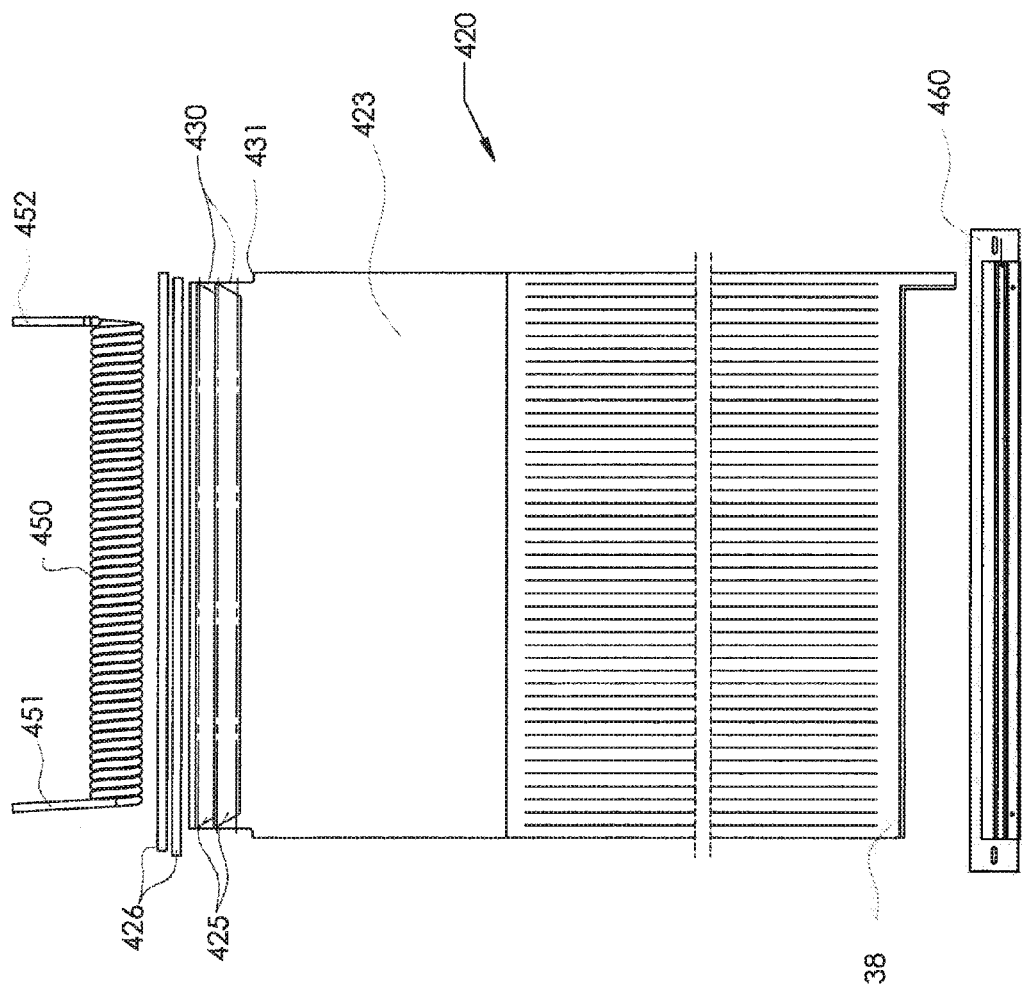
FIG. 15 is a diagrammatic exploded top view of the collector illustrated in FIG. 14 emphasizing some of the components of the collector.

Referring next to FIGS. 14-15, another embodiment of the invention will be described. FIG. 14 illustrates a collector with a heat exchanger installed. FIG. 15 is an exploded view of the collector illustrated in FIG. 14 which highlights the geometry of the sheets and some of the internal components of the collector system. This embodiment facilitates easier installation of the heat exchanger and accordingly easier replacement of the thin film collector. Additionally, this embodiment includes several features that further reinforce potentially weaker sections of the collector. In this embodiment, the general construction of the collector 420 may be quite similar in most respects to the embodiments described above. For simplicity, the similar structures are not described again in detail. Like in the previously described embodiments, the top and bottom sheets are welded together using a series of peripheral collector body welds, riser welds 32, etc. that together to define a multiplicity of longitudinally extended risers 26 that extend between the storage tank 423 and a lower manifold 38. In the embodiment of FIGS. 14 and 15, the risers 26 open directly into both the storage tank 423 and the lower manifold 38.

In the embodiment illustrated in FIGS. 14 and 15, the upper end portions of the top and bottom sheets that constitute the upper portion of the storage tank are not welded together. Rather, as seen in FIG. 15, each of the top and bottom sheets includes a flap 430 that is not welded to the opposing sheet. In the illustrated embodiment, the flaps 430 have a slightly smaller width than the overall collector thereby forming small unwelded steps 431, although this is not a requirement. Additionally, the flap on the back sheet extends further than the flap on the front sheet, although again, this is not a requirement. The sides of the top and bottom sheets are welded together all of the way to the flaps, and generally the flaps are defined as the upper portions of the top and bottom sheets that are not welded together.

Figure 17:
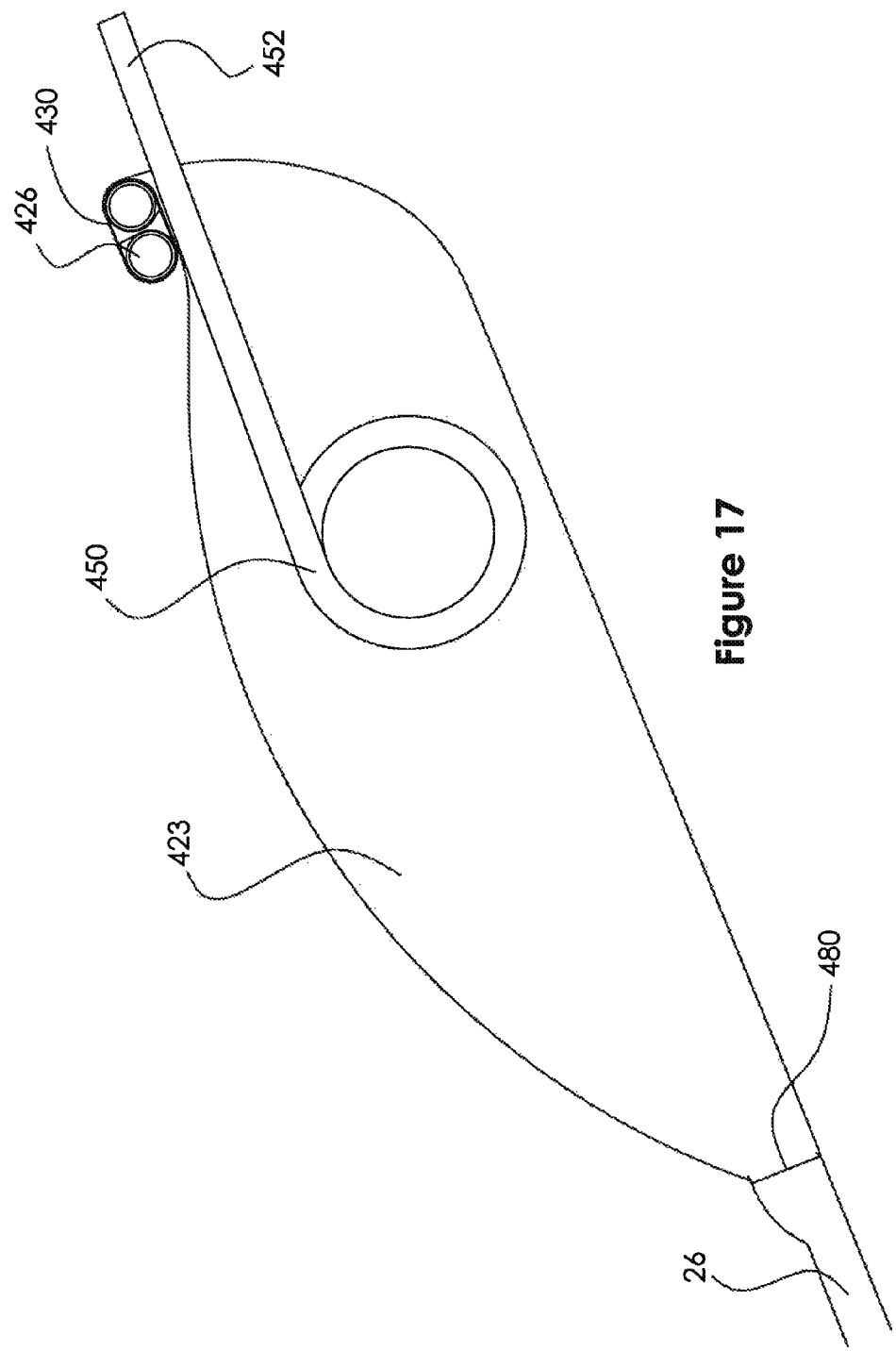
FIG. 17 is a diagrammatic cross sectional side view of the storage tank portion of the collector illustrated in FIG. 14.

Each flap has a laterally extending support rod channel 425 formed near its upper edge. The support rod channels can be formed in a wide variety of manners, as for example, by doubling back a distal end of the flap and welding it to a more proximal portion of the flap to thereby define a support rod channel 425 which is generally similar to the tie down channels described in conjunction with previous embodiments. In another example, the support rod channels may be formed by welding respective film segments to each of the flaps. With these arrangement, the uninstalled (i.e., before insertion of the heat exchanger) and unfilled collector has a large upper opening that extends the entire width of the collector and opens into the region that defines the storage tank 423. The opening looks much like the opening a plastic trash bag would have. With this arrangement, a heat exchanger—such as the heat exchanger 450 illustrated in FIG. 15 may very readily be inserted into the storage tank simply by inserting the heat exchanger into the large opening at the top end of the collector defined by the flaps 430. To close the top of the collector, support rods 426 are inserted into the support rod channels 425. The geometry of the support rods may be varied, but rods or cylindrical tubes work well for the intended purpose. Once the support rods 426 have been inserted, the support rods may be placed together and tightly rolled together as far as they can go down the flaps such that the flaps 430 are rolled tightly about the support rods as best seen in FIG. 17. That is, the support rods are rotated as a unit such that the flaps 430 wrap tightly around the support rods 426. The steps 431 provide openings that the heat exchanger inlet and outlet pipes 451, 452 may pass through to exit the storage tank 423 as best seen if FIG. 18. The steps are preferably sized such that when the flaps are completely taken up by the support rods, the edges of the top and bottom sheets in the regions of the steps 431 tightly squeeze around the heat exchanger inlet and outlet pipes 451, 452, thereby cooperating with the rolled up flaps to effectively close off the top opening of the storage tank. In this embodiment, the openings around the inlet and outlet pipes 451, 452 are not actually sealed and thus the collector would leak if it is positioned flat or with the storage tank below the manifold. However, in operation the collectors are installed such that the storage tank is located above the manifold and the collectors may be filled with water (or other suitable working fluid) to a level that fills the risers and substantially fills the tank without actually rising to the level of the steps/top opening so that water does not leak from the collector. Although the junction between the sheets and the inlet/outlet pipes are not sealed in the illustrated embodiment, it should be appreciated that seals could readily be provided in alternative embodiments.

Figure 18:
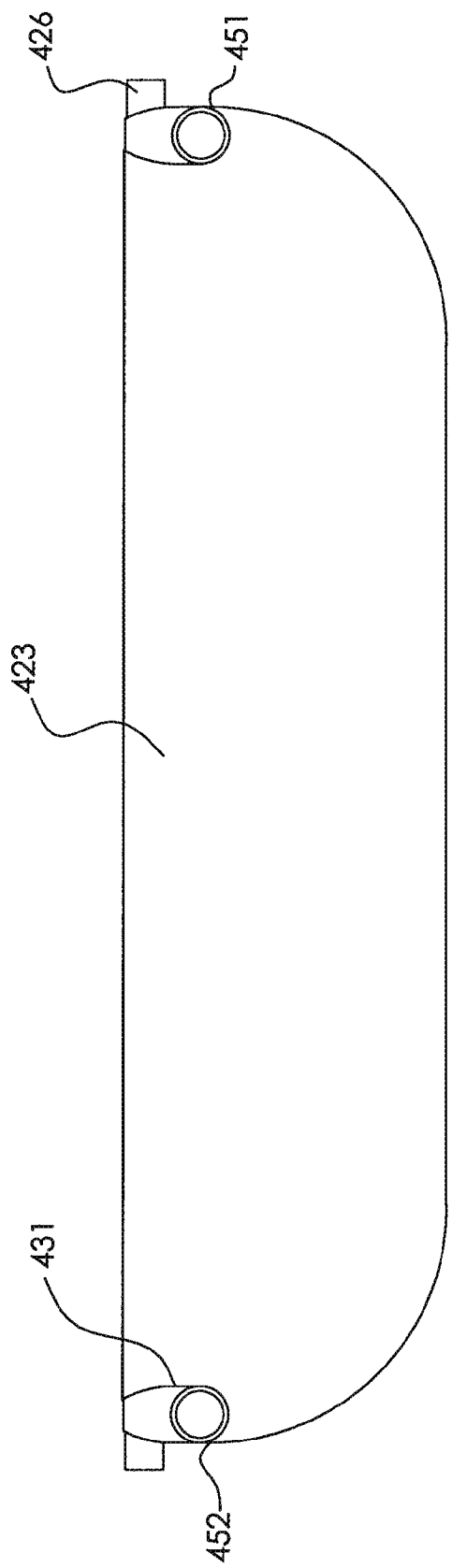
FIG. 18 is a top end view of the collector illustrated in FIG. 14, which shows the top of the storage tank.

The resulting structure of the storage tank is best illustrated in FIGS. 17 and 18. FIG. 17 is a cross sectional side view of the storage tank taken from a line just outside of the heat exchanger 450 and therefore showing outlet pipe 452, which protrudes through the walls of the storage tank 423 at the steps 431 as better seen in the top view of the storage tank illustrated in FIG. 18. FIG. 17 also illustrates that the flaps 430 are wrapped tightly around the support rods 426 in the assembled state.

In the embodiment of FIGS. 14 and 15, the support rods 426 may be used in place of the tie down bar 122 described above and accordingly, may be clamped by the brackets 121 of the housing 111 described above with respect to FIG. 4 to help hold the collector in place. In other embodiments, alternative tie down structures may be provided. It should be appreciated that the described arrangement allows heat exchangers to be installed in a collector very easily. This arrangement has a wide variety of uses. For example, a suitable heat exchanger can first be plumbed as a fixture into a solar collection system before the heat exchanger is even installed into the collector. A simple collector bag can then be installed over the heat exchanger with any desired housing and tie downs to complete the system. Thereafter, if the collector bag wears out the collector bag can readily be replaced without requiring the plumbing of the heat exchanger to be disturbed or altered in any way. It should be apparent that this provides and extremely simple and cost effective manner for installing and replacing collector units. It is noted that the nature of most low cost commercially available thin film polymer sheets is that they will degrade over time. Since the cost of the collector bags can be very low, they can readily be replaced if and when degradation or other damage to the collector occurs.

As suggested above, there are several locations within the described collectors that are more susceptible to stress concentrations than others. The embodiments described above incorporate a variety of mechanisms, including weld reinforcements, laterally extending tie down to distribute the load of the collector, etc. in an effort to reduce and/or handle stress concentrations. The embodiment illustrated in FIGS. 14 and 15 has several other features that go even further to reduce and/or handle stress concentrations. These include the provision of a manifold support 460 and a storage tank baffle 480.

Figure 16:
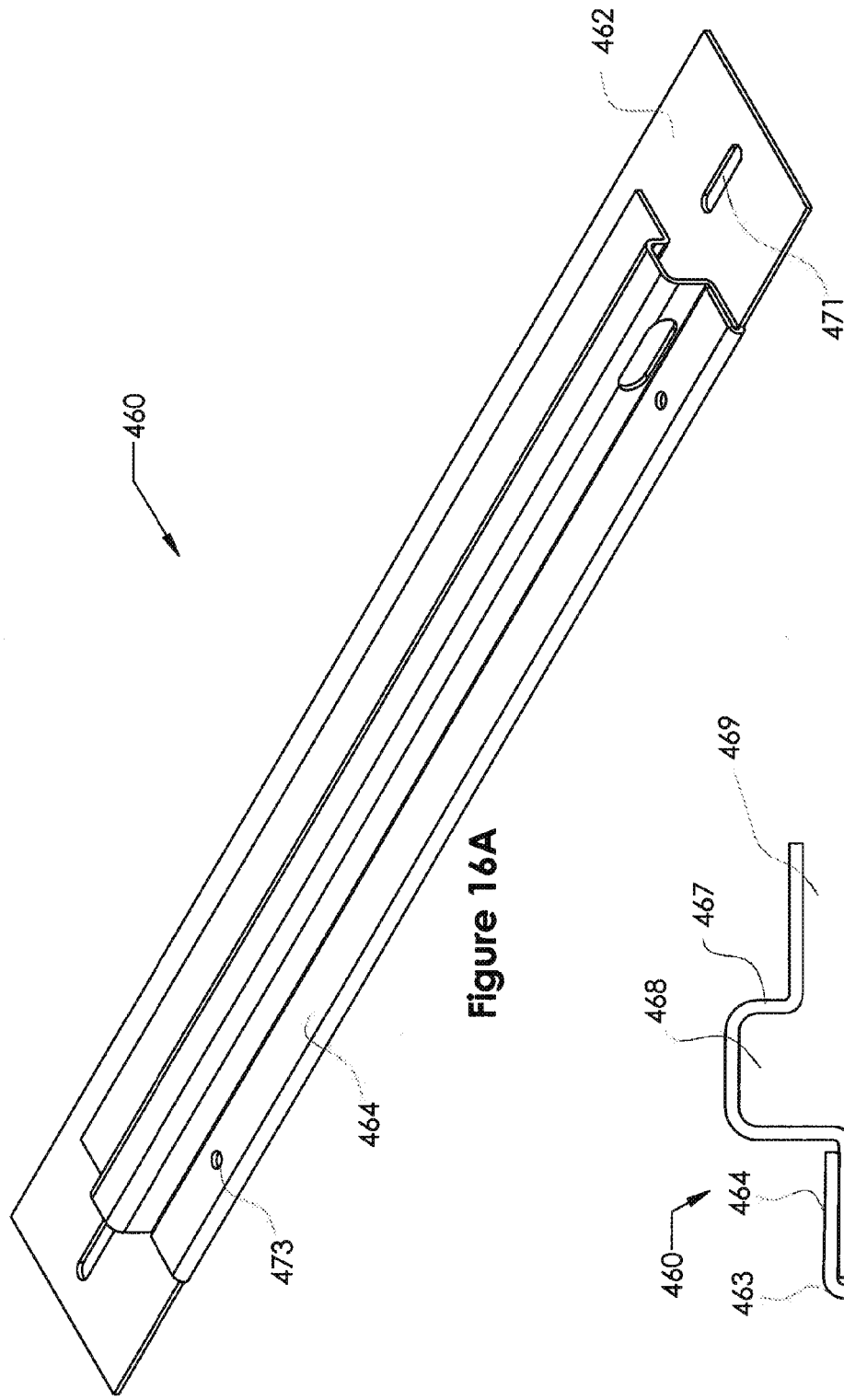
FIGS. 16(a) and 16(b) are perspective and end views of an exemplary manifold support suitable for reinforcing the bottom manifold region of any of the illustrated collectors.

The region of the collector that is most susceptible to stress concentrations is the lower end of the riser welds 32. In order to further reinforce this area, a manifold support 460 is provided. The construction of a representative manifold support 460 is illustrated in FIGS. 16(a) and 16(b). The illustrated manifold support 460 includes an elongated, generally flat metallic bottom plate 462 having an integral clip 463 that is formed by folding an extension 464 of the bottom plate back over the bottom plate with a small gap (not labeled) formed there between. The bottom plate preferably has a length that is longer than the width of the collector when the collector is full of water. The gap receives a second plate 467 that is bent in a manner that cooperates with the bottom plate to define a generally larger manifold region 468 and a generally narrower riser region 469 between the plates 462, 467.

The manifold support 460 is positioned over the bottom end of the collector such that the manifold 38 is positioned within the manifold region 468 and the bottom ends of the risers are positioned within the riser region 469. A laterally compressible stiffener (not shown in FIG. 15) such as the stiffener described above with respect to FIG. 9(a) is positioned within the manifold 38. The stiffener 171 has a diameter that is greater than the height of the narrowed riser region 469 of the manifold support 460. With this arrangement, the stiffener 171 is constrained to remain within the manifold region 468 and can not be pulled through the riser region, thereby effectively locking the manifold 38 in place. For installation, the deflated manifold with a stiffener inside can be inserted into the manifold region 468 from one of the sides of the manifold support 460. The manifold region 468 is sized such that the manifold 38 presses against the walls of the manifold support in the manifold region when the collector is filled with a working fluid. Similarly, the narrower riser region 469 is arranged to compress the risers at the bottom ends of the riser welds 32. The compression helps distribute the load seen at the bottom end of the risers and substantially reduces stress concentrations at the bottom ends of the riser welds thereby substantially increasing the overall burst strength of the collector. Although this compression reduces the cross sectional area of the risers in the compressed region, the standoff distance between the plates is set large enough so that the manifold support 460 does not unduly restrict fluid flow within the risers 26 or the manifold 38.

The manifold support may be used as a tie down structure eliminating the need for the bottom tie down channel illustrated in some of the embodiments discussed above. To secure the collector in place, suitable openings 471 for tie down straps, bolts or other appropriate fastening devices may be provided at desired locations in the manifold support 460. Additionally, appropriate latches 473 may optionally be provided to better fasten the plates of the manifold support together.

The manifold support can be formed from a wide variety of materials including metal, various plastics, etc. Although a particular manifold support structure has been described, it should be appreciated that the geometry and construction of the manifold support may be widely varied while still providing the desired weld termination support functionality. For example, when production volumes are sufficient to justify it, the manifold supports may be formed as a single molded or extruded part, thereby simplifying its constructions. In the illustrated embodiment, the bottom plate is generally flat and the top plate is shaped to define the desired manifold and riser cavities. However, the bottom plate may additionally or alternatively be bent in a manner such that causes the manifold cavity 468 to extend both above and below the riser cavity. Additionally, in the illustrated embodiment a single manifold support 460 is provided. However, in alternative embodiments, a segmented manifold support structure made of several distinct manifold support components could be provided, or a single manifold support structure could be used to support the bottom manifolds of multiple collectors arranged side by side.

Another region of the collector that is susceptible to stress concentrations are the weld terminations at the top of the riser welds 32 and more generally the welds in the region of the bottom of the storage tank 423. Referring next to FIGS. 17 and 19, a simple baffle structure suitable for reinforcing the tank region of the collector will be described. FIG. 17, which is a cross sectional view of the storage tank illustrates a suitable position for the baffle 480 within the storage tank 423. FIG. 19 is a diagrammatic perspective cutaway view of a small segment of the baffle which is intended to help show its structure. In the illustrated embodiment, a baffle 480 is positioned within the storage tank 423 at a generally lower position within the tank that is vertically spaced apart from (i.e. above) the weld terminations at the top of the riser welds 32. The baffle is formed from relatively small segment of a thin polymer sheet—which may be the same material that is used to form the top and bottom collector sheets. The baffle 480 has a plurality of relatively large openings 482 that permit the flow of water between an upper portion of the storage tank 423 and a lower portion of the storage tank/the risers. The baffle is welded to the top and bottom sheets and has a width that is appropriate to constrain the spreading of the bottom portion of the storage tank. This mechanically reinforces the storage tank and substantially reduces the stress concentrations experienced by the weld terminations at the top of riser welds 423. It also reduces stress concentrations on the peripheral welds that define the exterior of the storage tank and particularly the portions of the peripheral welds in the region near the bottom of the storage tank 423. It is noted that small top and bottom end portions (not labeled) of the polymer sheet used to form the baffle 480 that extend beyond the weld lines used to attach the baffle to the top and bottom sheets can be seen as loose flaps in the view of FIG. 19. It should be appreciated that in other embodiments the entire top and bottom end of the baffle could be welded to the top and bottom sheets respectively using larger weld lines thereby eliminating the flaps. However, when small, the flaps are unobtrusive and do not effect the performance of the collector.

Although the manifold support 460 and baffle 480 stress reduction components are described together as part of the collector illustrated in FIGS. 14 and 15, it should be appreciated that these structures can be used independently, together, or combined with other stress reduction components or without other stress reduction components as appropriate and desired for a particular collector design. Further, these components may be integrated independently or together in any of the previously described collector embodiments. Still further, it should be appreciated that any or all of the variations described above (e.g., glazing, weld reinforcements, tie down channels, etc.) may also be incorporated individually or in any desired combinations into the collector 420.

Although only a few embodiments of the invention have been described in detail, it should be appreciated that the invention may be implemented in many other forms without departing from the spirit or scope of the invention. For example the internal plumbing of a couple of representative collector designs have been illustrated in FIGS. 1, 10, 11 and 12(a). However, it should be apparent that a wide variety of other layouts can readily be employed. Indeed, it should be appreciated that one of the design strengths of the described thin film collector is that the geometry of the collector, the flowpaths within the collector, the size, number and geometry (and in some cases existence) of the storage tanks, risers, manifolds, ports and the other components may be widely varied to meet the needs of a particular application with minimal effort.

In the illustrated embodiments, the riser welds have been illustrated as being extended continuous welds thereby forming extended risers. However, in alternative embodiments, the riser welds do not need to be continuous and indeed event spaced spot welds can be used to couple the thin sheets together. Thus, the geometry of the risers and the riser welds can be widely varied as well. By way of example, in some situations it may be desirable to provide flow restrictions near the opening of the risers, manifolds or feed channels into the storage tank in order to increase stratification within the tank thereby providing higher potential water temperatures.

It should be apparent that the described thin film collectors can be used in a wide variety of applications. The peripheral welding provides a good seal and the various ports can readily be sealed so that evaporation of the working fluid is minimized during use.

In view of all of the foregoing, it should be apparent that the present embodiments are illustrative and not restrictive and the invention is not limited to the details given herein, but may be modified within the scope and equivalents of the appended claims.

What is claimed is:

1. A solar collector comprising:
  a front sheet formed from a polymer film;
  a back sheet formed from a polymer film, wherein the front and back sheets are welded together to define a storage tank, a manifold and a multiplicity of fluid flow channels that extend substantially longitudinally between the manifold and the storage tank, the storage tank being located at a first end of the panel and the manifold being located at a second end of the panel, wherein the fluid flow channels, the manifold and the storage tank are arranged to facilitate a thermosiphon based circulation of a working between the fluid flow channels and the storage tank and wherein all of the fluid flow channels open directly into the manifold and directly into the storage tank; and
  a heat exchanger disposed in the storage tank, the heat exchanger having a target fluid inlet and a target fluid outlet that cooperate to permit a target fluid to pass from outside of the solar collector through the heat exchanger and back outside the solar collector without any direct contact between the working fluid and the target fluid, whereby the heat exchanger facilitates the transfer of heat between the working fluid within the storage tank and the target fluid passing through the heat exchanger.

2. A solar collector panel as recited in claim 1 wherein the front and back sheets are further welded to define elongated tie down channels on top and bottom ends of the solar collector panel, each tie down channels being arranged to receive an associated tie down mechanism and not being in fluid communication with either the storage tank or the fluid flow channels, wherein the elongated tie down channels each have a longitudinal axis that extends substantially perpendicular to the fluid flow channels in a plane defined by the fluid flow channels.

3. A solar collector panel as recited in claim 1 further comprising;
  a glazing sheet formed from a substantially transparent polymer film, wherein the glazing sheet is attached to the front sheet via a multiplicity of longitudinally extending substantially parallel glazing welds, the glazing sheet being arranged such that during operation, an air gap is provided between the glazing sheet and the front sheet in regions between adjacent glazing welds to help insulate the solar collector panel; and
  an air fill port to facilitate varying the amount of air provided in the gap between the glazing sheet and the front sheet.

4. A solar collector as recited in claim 1 further comprising a manifold spacer positioned within the manifold that helps maintain the manifold in an open position.

5. A solar collector as recited in claim 1 wherein the plurality of fluid flow channels open directly into the storage tank.

6. A solar collector as recited in claim 1 further comprising a baffle formed from a polymer film that is welded to the front and back sheets at a position that helps reinforce the storage tank, the baffle including a plurality of openings that facilitate fluid flow between the storage tank and the fluid flow channels.

7. A solar collector panel as recited in claim 1 further comprising a fill port that may be used to facilitate filling the fluid flow channels and the storage tank portions of the solar collector with a working fluid, wherein the fill port is defined by welds between the front and back sheets.

8. A collector system as recited in claim 1 wherein the collector sheet is replaceable, the collector system further comprising an insulated box that covers the storage tank, but leaves the majority of the portion of the front sheet that defines the fluid channels exposed to facilitate the collection of solar energy.

9. A solar collector as recited in claim 1 further comprising a manifold support positioned outside of the manifold and arranged to reinforce the manifold and a lower region of the fluid flow channels.

10. A solar collector comprising:
a front sheet formed from a polymer film;
a back sheet formed from a polymer film, wherein the front and back sheets are welded together to define a storage tank, a manifold and a plurality of fluid flow channels that extend substantially longitudinally between the manifold and the storage tank, wherein each of the fluid flow channels opens directly into the storage tank, the storage tank being located at a first end of the panel and the manifold being located at a second end of the panel, wherein the fluid flow channels, the manifold and the storage tank are arranged to facilitate the circulation of a working fluid between the fluid flow channels and the storage tank;
an elongated tie down channel on a top end of the solar collector panel, the tie down channel being defined by welds between the front and back sheets and arranged to receive a corresponding elongated tie down mechanism, wherein the tie down channel is not in fluid communication with either the storage tank or the fluid flow channels, the elongated tie down channel having a longitudinal axis that extends substantially perpendicular to the fluid flow channels in a plane defined by the fluid flow channels;
a manifold spacer positioned within the manifold that helps maintain the manifold in an open position;
a manifold support positioned outside of the manifold and arranged to reinforce the manifold and a lower region of the fluid flow channels, wherein the manifold support also serves as a second tie down structure;
a baffle formed from a polymer film that is welded to the front and back sheets at a position that helps reinforce the storage tank, the baffle including a plurality of openings that facilitate fluid flow between the storage tank and the fluid flow channels;
a fill port that may be used to facilitate filling the fluid flow channels and the storage tank portions of the solar collector with a working fluid; and
a heat exchanger disposed in the storage tank, the heat exchanger having a target fluid inlet and a target fluid outlet that cooperate to permit a target fluid to pass from outside of the solar collector through the heat exchanger and back outside the solar collector without any direct contact between the working fluid and the target fluid, whereby the heat exchanger facilitates the transfer of heat between the working fluid within the storage tank and the target fluid passing through the heat exchanger.

11. A solar collector panel as recited in claim 10 further comprising an insulated box that covers the storage tank, but leaves the majority of the portion of the front sheet that defines the fluid channels exposed to facilitate the collection of solar energy.

12. A solar collector panel as recited in claim 10 further comprising an insulation sheet formed from a polymer film, wherein the insulation sheet is welded to the back sheet.

13. A solar collector panel as recited in claim 10 further comprising an insulating sheet formed from a polymer film, wherein the insulating sheet is welded to at least one of the front and back sheets in a region over the storage tank.

14. A solar collector as recited in claim 10 wherein a junction between the storage tank and the heat exchange unit is sealed.

15. A solar collector panel as recited in claim 10 wherein the front and back sheets are formed from a single sheet polymer film.

16. A solar collector as recited in claim 10 wherein the manifold spacer has a geometry selected from the group consisting of cylindrical and spiral geometries.

* * * * *